(12) United States Patent
Kumm et al.

(10) Patent No.: US 12,643,241 B1
(45) Date of Patent: Jun. 2, 2026

(54) SYSTEM FOR AUTONOMOUS ATTACHMENT OF METAL DECKING

(71) Applicant: BlueScope Buildings North America, Inc., Kansas City, MO (US)

(72) Inventors: Dan Kumm, Kansas City, MO (US); Derek Andrew Mazur, Reno, NV (US); Brent Baskin, Littleton, CO (US); Dylan Lee Shadoan, Black Hawk, CO (US); Joshua Thomas Grip, Arvada, CO (US); Kyle Joseph FitzGerald, Broomfield, CO (US); Rourke Ridnour Anders, Colorado Springs, CO (US); Timothy J. Louey, Glen Waverly (AU); Kirk Brian Williams, Golden, CO (US)

(73) Assignee: BlueScope Buildings North America, Inc., Kansas City, MO (US)

( * ) Notice: Subject to any disclaimer, the term of this patent is extended or adjusted under 35 U.S.C. 154(b) by 0 days.

(21) Appl. No.: 19/386,859

(22) Filed: Nov. 12, 2025

(51) Int. Cl.
B25J 11/00 (2006.01)
B25J 5/00 (2006.01)

(52) U.S. Cl.
CPC ............. B25J 11/005 (2013.01); B25J 5/007 (2013.01)

(58) Field of Classification Search
CPC ................................ B25J 11/005; B25J 5/007
See application file for complete search history.

(56) References Cited

U.S. PATENT DOCUMENTS

| 7,305,748 | B2 | 12/2007 | Sprague et al. |
| 7,610,668 | B2 | 11/2009 | Sprague et al. |
| 7,954,681 | B2 | 6/2011 | Smith et al. |
| 7,963,013 | B2 | 6/2011 | Sluiter |
| 8,544,163 | B2 | 10/2013 | Sarh et al. |
| 8,925,173 | B2 | 1/2015 | Smith et al. |
| 8,925,178 | B2 | 1/2015 | Smith et al. |
| 8,925,185 | B2 | 1/2015 | Sarh et al. |
| 9,776,330 | B2 | 10/2017 | Day et al. |
| 9,945,128 | B1 | 4/2018 | Baird |
| 9,995,047 | B2 | 6/2018 | Raman et al. |
| 10,648,179 | B2 | 5/2020 | Baird |

(Continued)

FOREIGN PATENT DOCUMENTS

WO 2024223473 10/2024

*Primary Examiner* — Wade Miles
*Assistant Examiner* — James Brian Chin
(74) *Attorney, Agent, or Firm* — Lathrop GPM LLP; Robert J. Lambrechts

(57) ABSTRACT

An autonomous system attaches corrugated metal decking to roof structural members such as purlins, trusses or joists using a motorized wheeled carriage that traverses deck corrugations and drives threaded fasteners with closed-loop control. A fastener management module holds structural and sidelap screws in separate hoppers, orients them via screw sorters, and distributes them by a linearly translatable gantry to multiple drill units. Each unit includes a PWM-controlled drill, a linear actuator for plunge, and a spring-biased jaw release cooperating with a magnetized nut driver. A sensor assembly within a corrugation detects structural members, guides lateral alignment, and senses pre-existing fasteners; metal deck edge range sensors and a fail-safe brake preventing the system from running off the roof deck. Controllers networked over CAN coordinate motion, torque, patterns, speed, plunge of the fastening system, verify seating by motor/force feedback, and generate audit records of as-installed locations.

23 Claims, 27 Drawing Sheets

(56)             References Cited

U.S. PATENT DOCUMENTS

| | | |
|---|---|---|
| 11,851,897 B2 | 12/2023 | Bellissimo et al. |
| 12,110,698 B2 | 10/2024 | Bellissimo et al. |
| 2012/0174525 A1 | 7/2012 | Hinshaw et al. |
| 2021/0394316 A1 | 12/2021 | Beldon et al. |
| 2023/0392380 A1 | 12/2023 | Holm |

58

60

SYSTEM FOR AUTONOMOUS ATTACHMENT OF METAL DECKING

TECHNICAL FIELD

The subject matter relates to installation of metal deck systems over open framing such as purlins or structural joists, and more particularly to methods, tools, and autonomous or semi-autonomous systems that install such decking using fasteners.

BACKGROUND

Metal deck systems, often associated with the construction of industrial, commercial, and residential buildings, has evolved over the decades to meet the growing demand for durable, efficient, and cost-effective metal decking solutions. The development of metal deck systems can be traced back to the early 20th century, when steel emerged as a reliable construction material. During the early days, metal deck systems served primarily as a reinforcement for concrete roofs or floors. However, as industrialization progressed and the demand for larger, more complex structures grew, the role of metal decking expanded, becoming a key component in building construction.

In the early years of metal decking, steel was commonly used due to its strength and affordability. At the time, the primary objective was to provide structural support. However, as construction needs became more complex, architects and engineers began to look for ways to improve the functionality of metal decking while maintaining or enhancing its structural integrity. In the 1930s, the introduction of the "corrugated" metal deck revolutionized the industry. This corrugated design, which involved creating ridges and valleys in the metal sheets, provided greater strength and stiffness, reducing the need for additional support structures.

By the 1950s and 1960s, metal deck systems gained popularity due to its ability to span large distances without the need for intermediate supports. Steel and aluminum became the primary materials used for decking, leading to increased durability and longevity. Around this time, the demand for lighter materials also grew, which led to the development of galvanized steel and aluminum alloys that were both stronger and lighter.

The Steel Deck Institute (SDI) uses lettered types for roof-deck profile families used widely in the U.S./Canada. Type B is the workhorse roof deck. The Type B are economical spans; common in 22-18 ga. This type is often chosen where diaphragm shear and roofing attachment flexibility are both needed. Type A (1.5 in., narrow-rib) is an older, narrower flute geometry and has lower capacity and fewer roofing fastener options than B. Type F (1.5 in., intermediate-rib) is between A and B in geometry/capacity. Type N (3.0 in., "deep-rib") is long-span roof deck; improved stiffness and diaphragm shear for larger bay spacing and heavier superimposed loads. Type N is common in 20-16 ga where spans or diaphragm demands drive the choice. Europe utilizes proprietary profiles tested and designed under Eurocode 3 for sheeting and Eurocode 4 for composite slabs. India utilizes proprietary profiles, China utilizes cold formed steel design covered by GB/T 50018 and Japan utilizes a composite steel standards that exist under JSCE/JISC umbrellas and are proprietary and designed and tested to local or Eurocode-influenced farmeworks. The disclosed system is intended to operate on all the above metal decking.

Because Type B deck has emerged as a popular choice in the roofing and flooring industry the disclosure set forth below discusses Type B; however, this is not intended to exclude the use of the disclosed system on any other type of deck. The B-deck is characterized by its "V" or "U" shaped ribs, which offer significant strength while still maintaining a lightweight profile. It became known for its high load-bearing capacity and its ability to serve as a substrate for other materials such as insulation, waterproof membranes, and roofing sheets. The B-deck design provides excellent spanning capabilities and is capable of withstanding significant loads, making it an ideal choice for large commercial, industrial, and institutional buildings.

One of the most significant advantages of metal deck systems is their strength. The corrugated design of B-deck provides an excellent balance of strength and flexibility, allowing it to support heavy loads while minimizing the need for additional structural support. The metal material itself, whether steel, aluminum, or galvanized steel, is resistant to corrosion and can withstand harsh weather conditions, including extreme heat, rain, snow, and even fire.

Metal decking is generally more cost-effective than traditional concrete or wood decking. It is less expensive to manufacture, transport, and install, making it an economical choice for large-scale projects. Additionally, its longevity and low maintenance requirements reduce the overall life-cycle costs for building owners.

SUMMARY

Disclosed herein is an automated system for attaching a metal deck system, such as a B-deck which can significantly enhance both quality and productivity by integrating various subsystems within a motorized wheeled carriage. Each subsystem works in tandem to streamline the installation process, ensure precision, and reduce manual labor.

A motorized wheeled carriage provides automated movement across the B-deck, ensuring smooth, consistent translation along the deck structure. The carriage can traverse the entire span of the deck and insert fasteners with high precision at a designated location, eliminating the need for manual fastening of the deck thereby reducing the cost of the metal deck system installation. This automation enables the system to move quickly and efficiently across large sections of the deck, reducing downtime and improving the speed of the installation process. The smooth and controlled movement of the carriage also ensures accurate positioning of the fasteners, enhancing the overall quality of the deck installation.

The fastener management subsystem integrated into the wheeled carriage stores and organizes fasteners in an optimized manner for easy access and quick deployment. This subsystem ensures that fasteners are prepared in advance and delivered at the right time and place, reducing delays caused by manual handling of fasteners. It can automatically dispense the correct number of fasteners in the proper sequence, which minimizes the chance of missing fasteners or using the wrong type. This streamlined approach reduces errors, improves the consistency of fastener placement, and speeds up the process, resulting in higher productivity and fewer rework incidents.

The metal deck structural detection subsystem is critical for ensuring fasteners are placed exactly at the locations where the metal decking needs to be secured to the structural members, such as bar joists, trusses or purlins. Using sensors this system detects the position of the trusses, joists, and purlins beneath the metal deck sheets. Accurate identification of these structural members ensures that fasteners are deployed precisely, preventing misalignment and ensuring the deck is securely attached. This improves the quality of the metal deck system installation by providing optimal fastener placement, thereby increasing the structural integrity of the deck.

The fastener installation subsystem within the wheeled carriage automatically deploys and secures fasteners into the detected trusses, joists or purlins. The disclosed system utilizes a robotic fastener deployment mechanism to insert fasteners quickly and with consistent force. By automating the installation of each fastener, the system ensures that they are correctly placed and tightened without the inconsistencies often found in manual installation. Automation of the fastener installation greatly speeds up the process, contributing to higher productivity, and ensures uniformity, enhancing the structural quality of the metal deck system.

The obstacle detection subsystem helps the system navigate the metal deck by detecting and avoiding physical obstructions in its path. Using technologies like LiDAR, infrared, or ultrasonic sensors, the system can detect debris, tools, scaffolding, or other obstacles that could block the carriage's movement. If an obstacle is detected, the system can automatically stop, reroute, or adjust its path, preventing damage to both the equipment and the metal deck. This functionality minimizes downtime, reduces the need for manual intervention, and ensures continuous operation, thereby maintaining a high level of productivity. Additionally, it ensures safety by preventing accidents or damage during installation.

The controller manages and synchronizes all subsystems to ensure they work together efficiently. It processes inputs from the metal deck structural detection system, the fastener management subsystem, the obstacle detection system, and other sensors to make real-time decisions. The controller adjusts the speed, positioning, and operation of the carriage, and coordinates the actions of the fastener management and installation subsystems to optimize the installation process. Centralized control allows for fine-tuning of various parameters to match specific project requirements, ensuring both efficiency and precision.

An object of the disclosed system is that the metal deck structural detection subsystem ensures fasteners are placed accurately, preventing misalignment and enhancing the structural integrity of the metal deck.

A further object of the disclosed system is that the fastener installation subsystem applies consistent force when driving fasteners, avoiding variations that could lead to weak or inconsistent fastenings or damaging tips of fasteners.

A further object of the disclosed system is that with automating fastener management and deployment, human error, such as misplacement of fasteners or using incorrect tools, is reduced, resulting in a more reliable and high-quality installation.

A further object of the disclosed system is that the motorized carriage moves quickly and efficiently across the metal deck, significantly reducing the time spent manually positioning and installing fasteners.

A further object of the disclosed system is that the system handles tasks such as fastener organization, positioning, and installation, reducing reliance on manual labor and speeding up the overall process. The automated system can work continuously, only stopping for the reloading of fasteners, essential maintenance or to address obstacles.

A further object of the disclosed system is that obstacle detection and the fastener management subsystem ensure the process runs smoothly with minimal interruptions, while the controller dynamically adjusts the system's performance to adapt to changing conditions.

A further object of the disclosed system is that the integration of these subsystems into an automated metal deck installation system offers significant improvements in both quality and productivity. By automating repetitive and labor-intensive tasks such as fastener management, structural detection, and installation, the system ensures faster and more accurate installation, reduces errors, and enhances the overall integrity of the metal deck. These capabilities ultimately result in a cost-effective, high-quality installation process that can complete projects more quickly, reduce labor costs, and ensure long-lasting, structurally sound metal deck system.

Various objects, features, aspects, and advantages of the disclosed subject matter will become more apparent from the following detailed description of preferred embodiments, along with the accompanying drawings in which numerals represent like components. The contents of this summary section are provided only as a simplified introduction to the disclosure and are not intended to be used to limit the scope of the appended claims.

Figure 16:
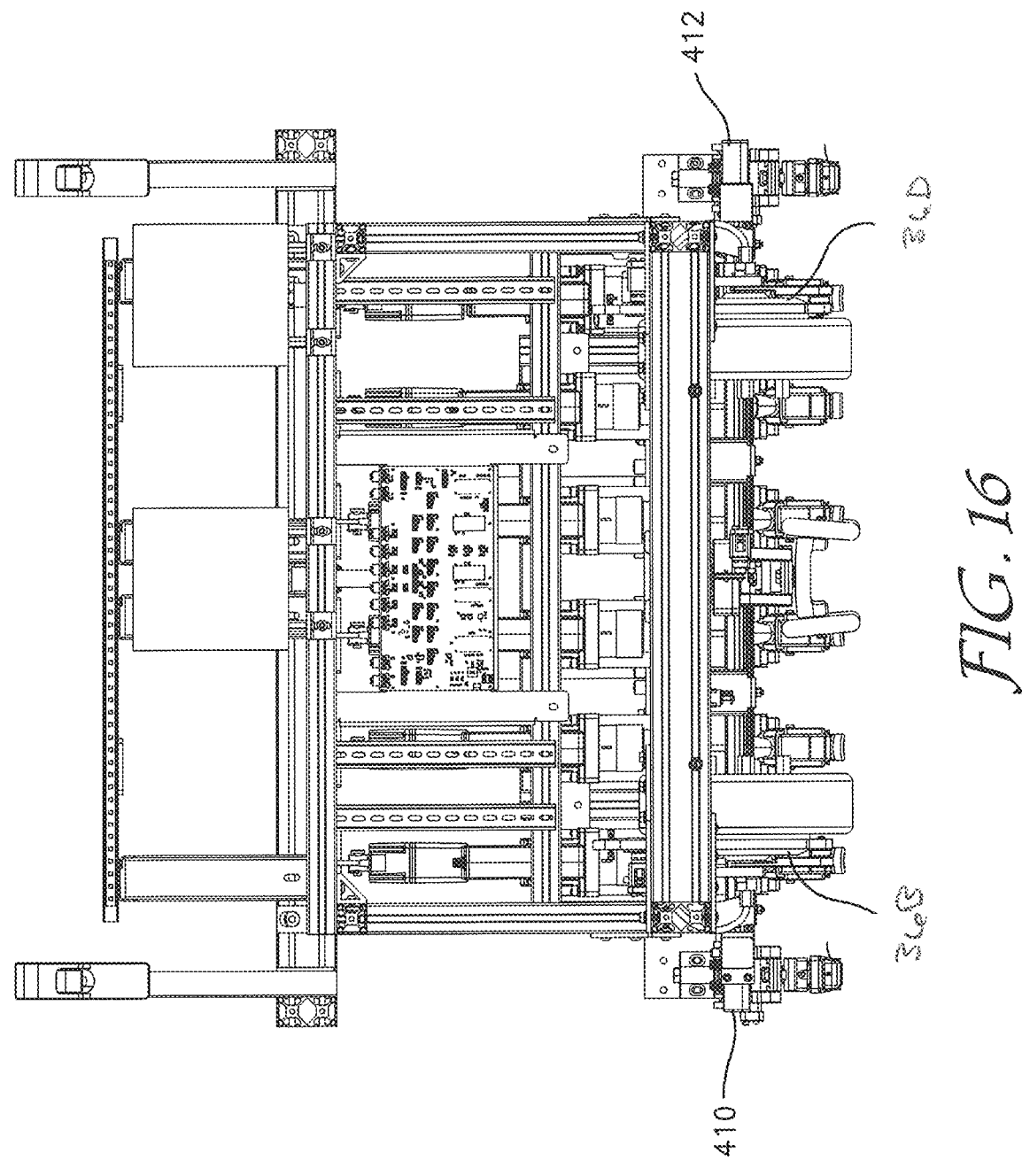
Figure 17:
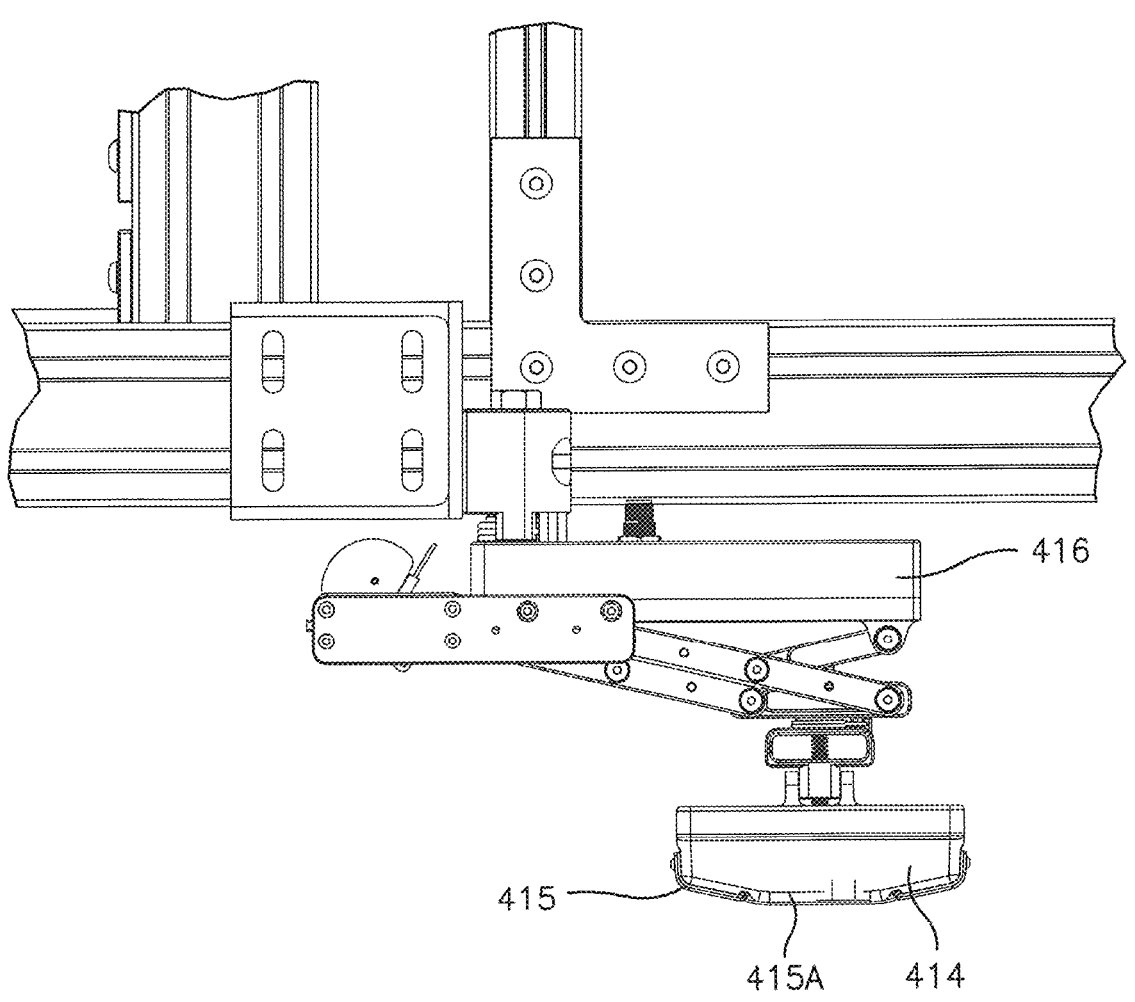
Figure 17A:
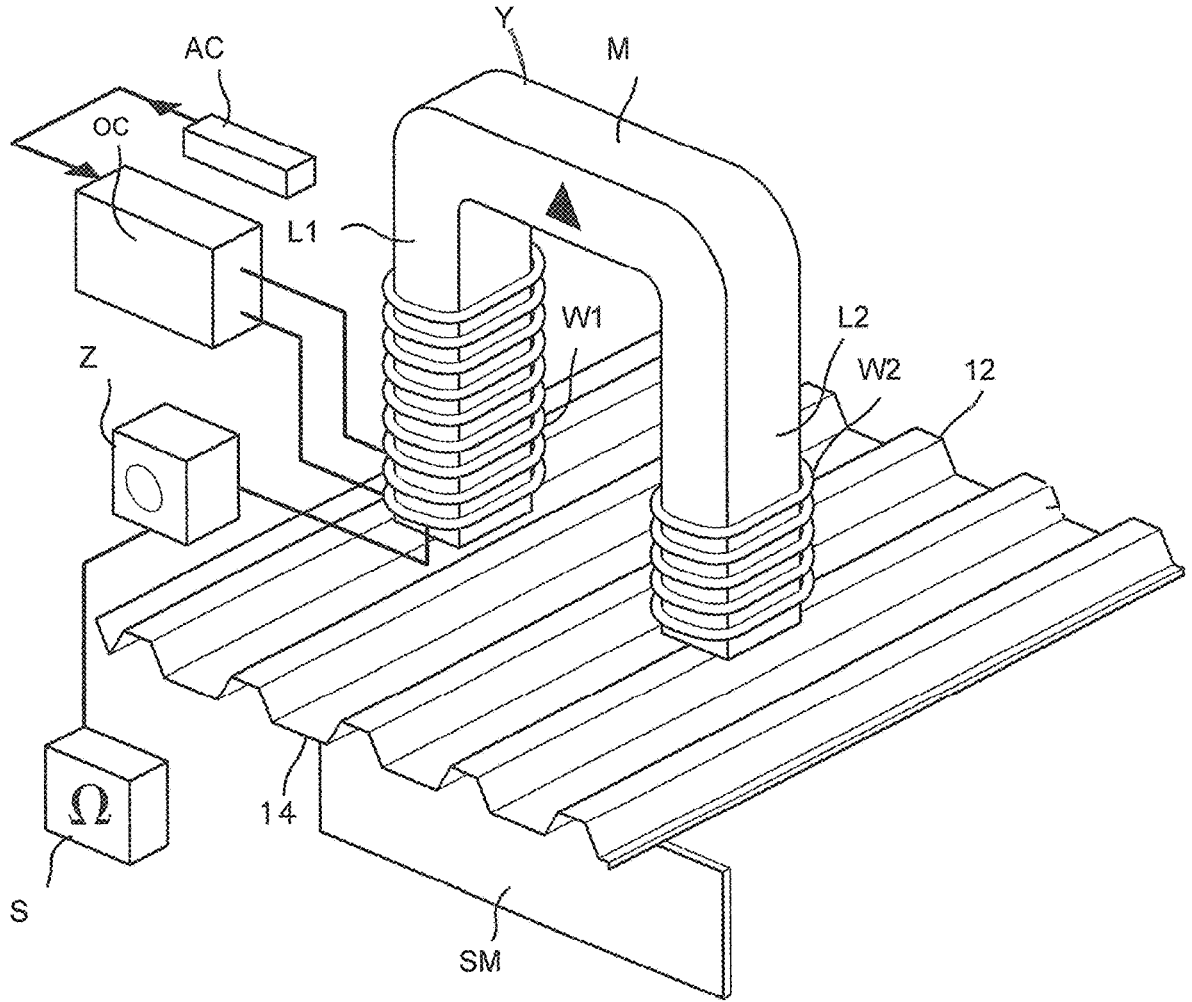
Figure 18:
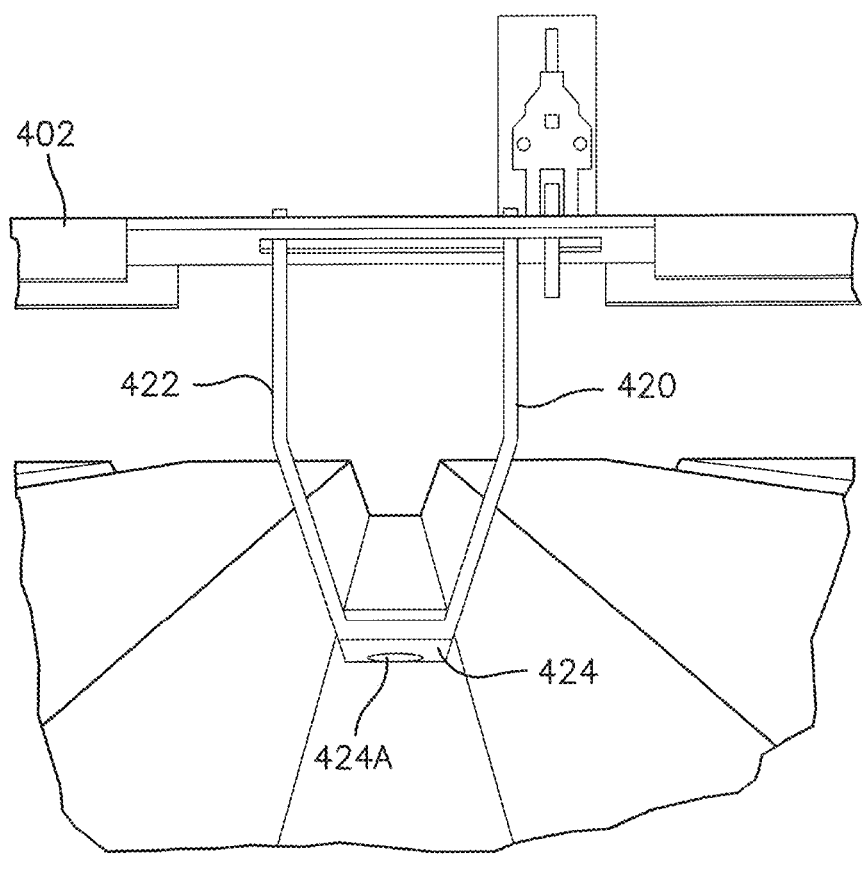
Figure 19A:
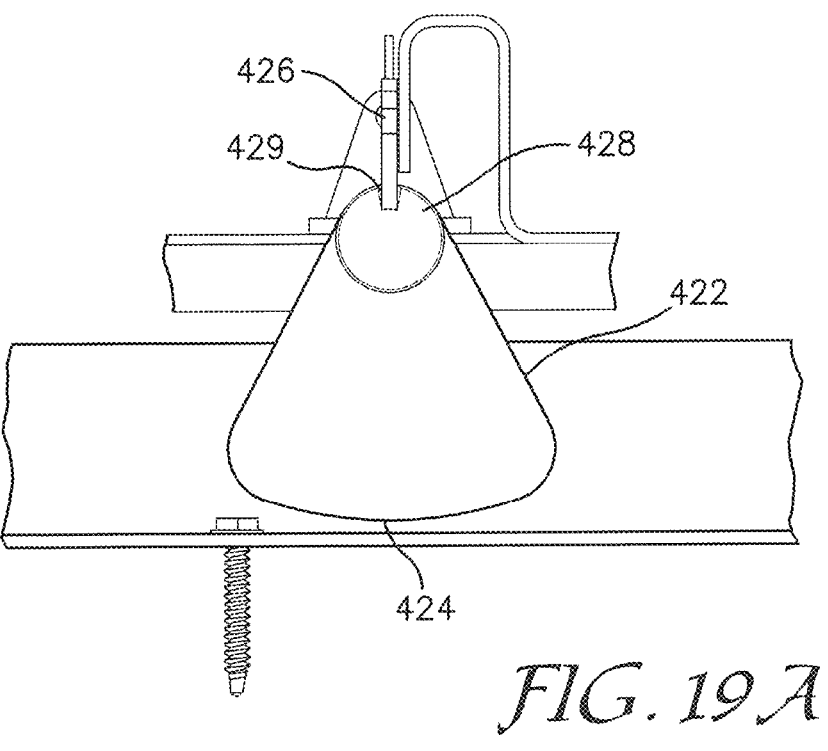
Figure 19B:
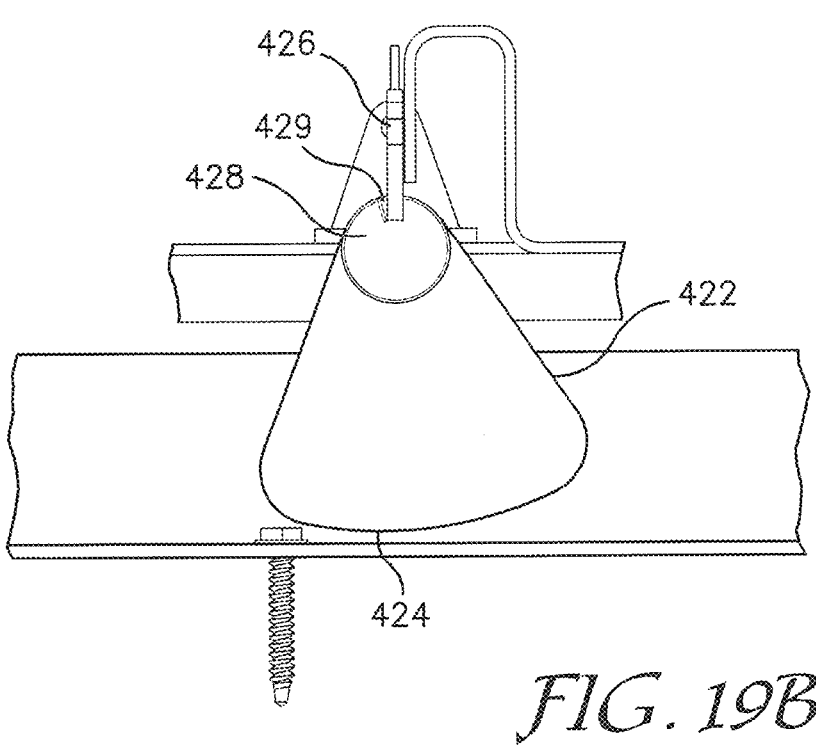
Figures 19C, 19D:
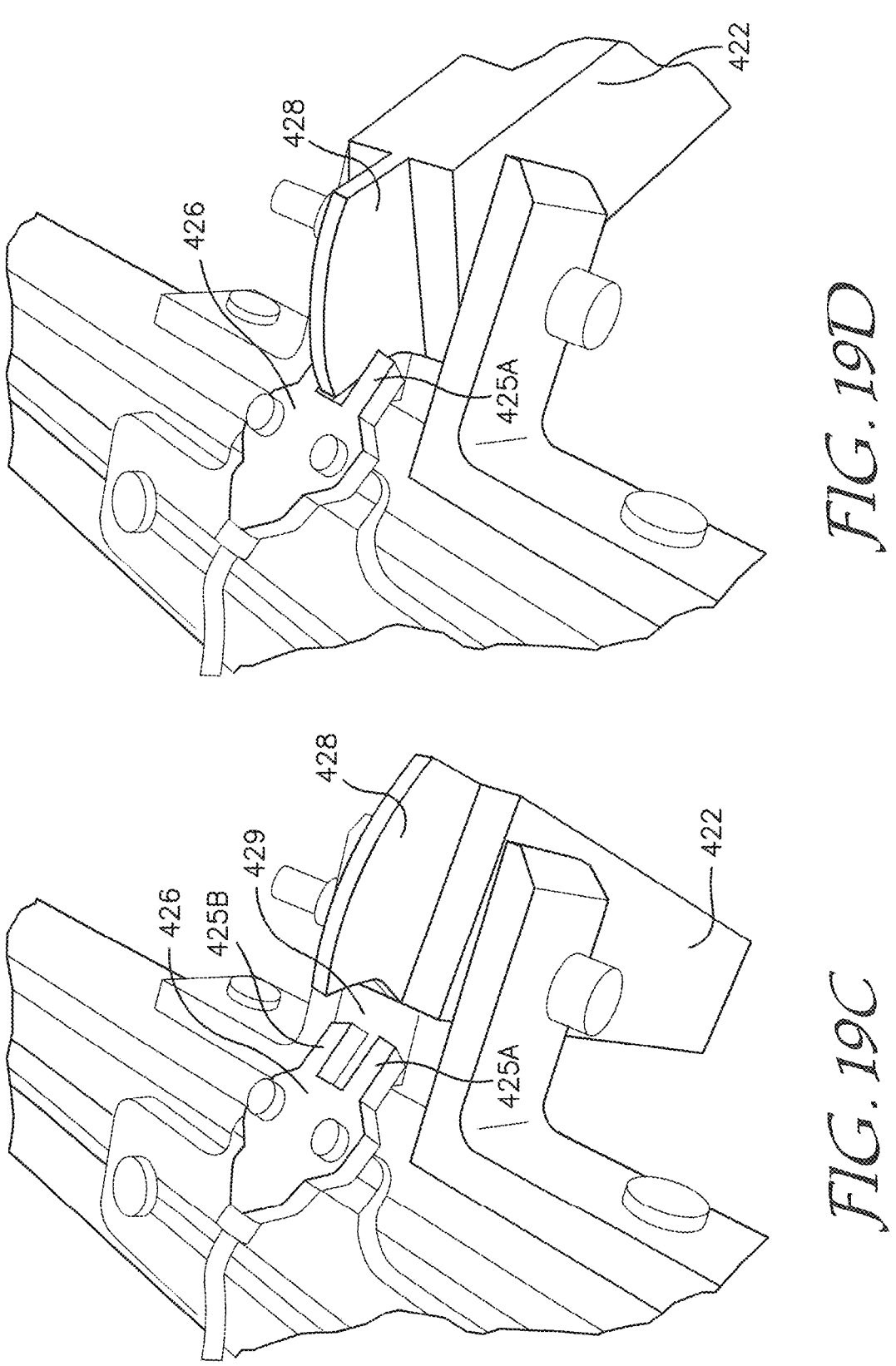
Figures 20, 21:
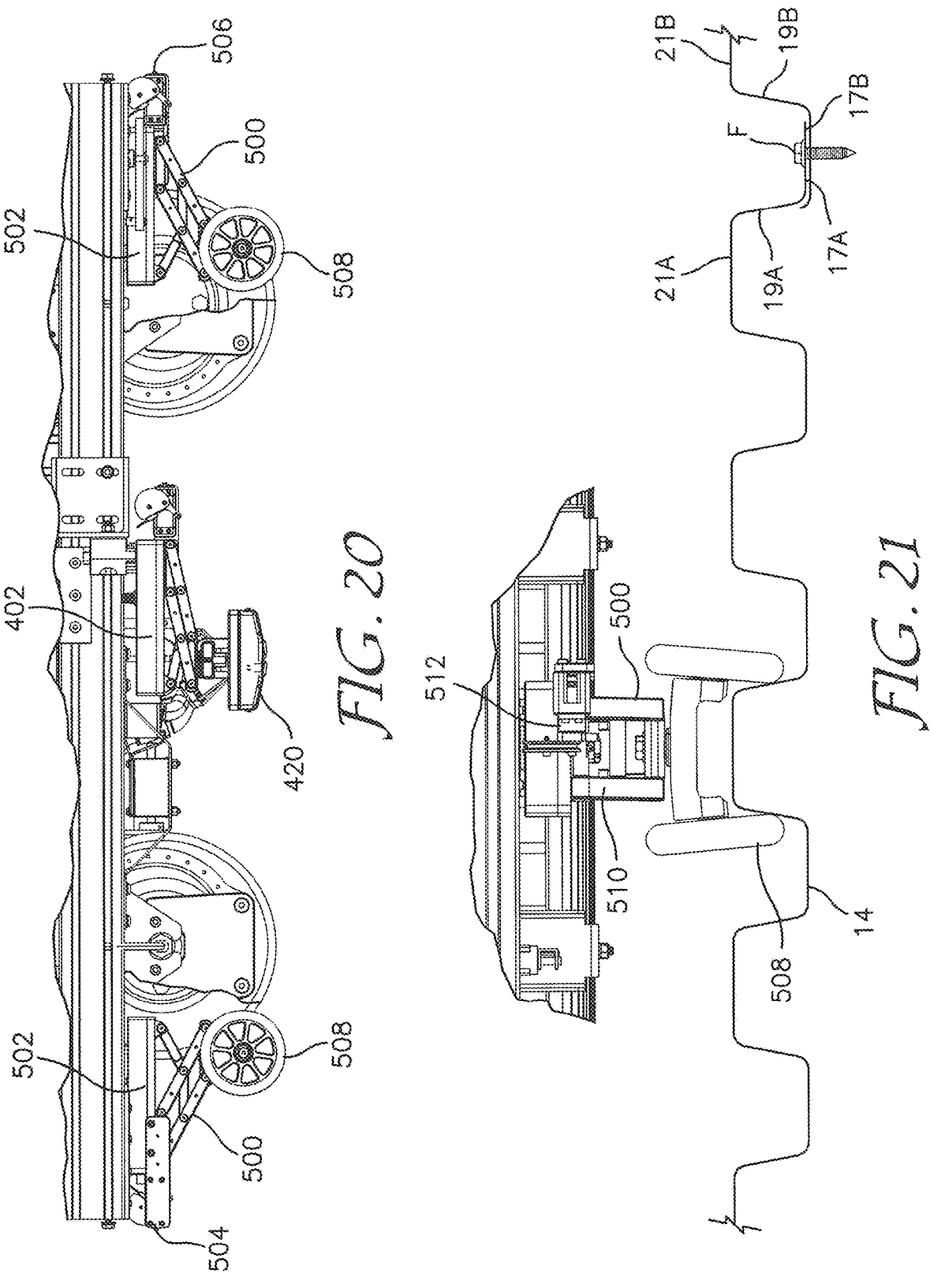
Figure 22:
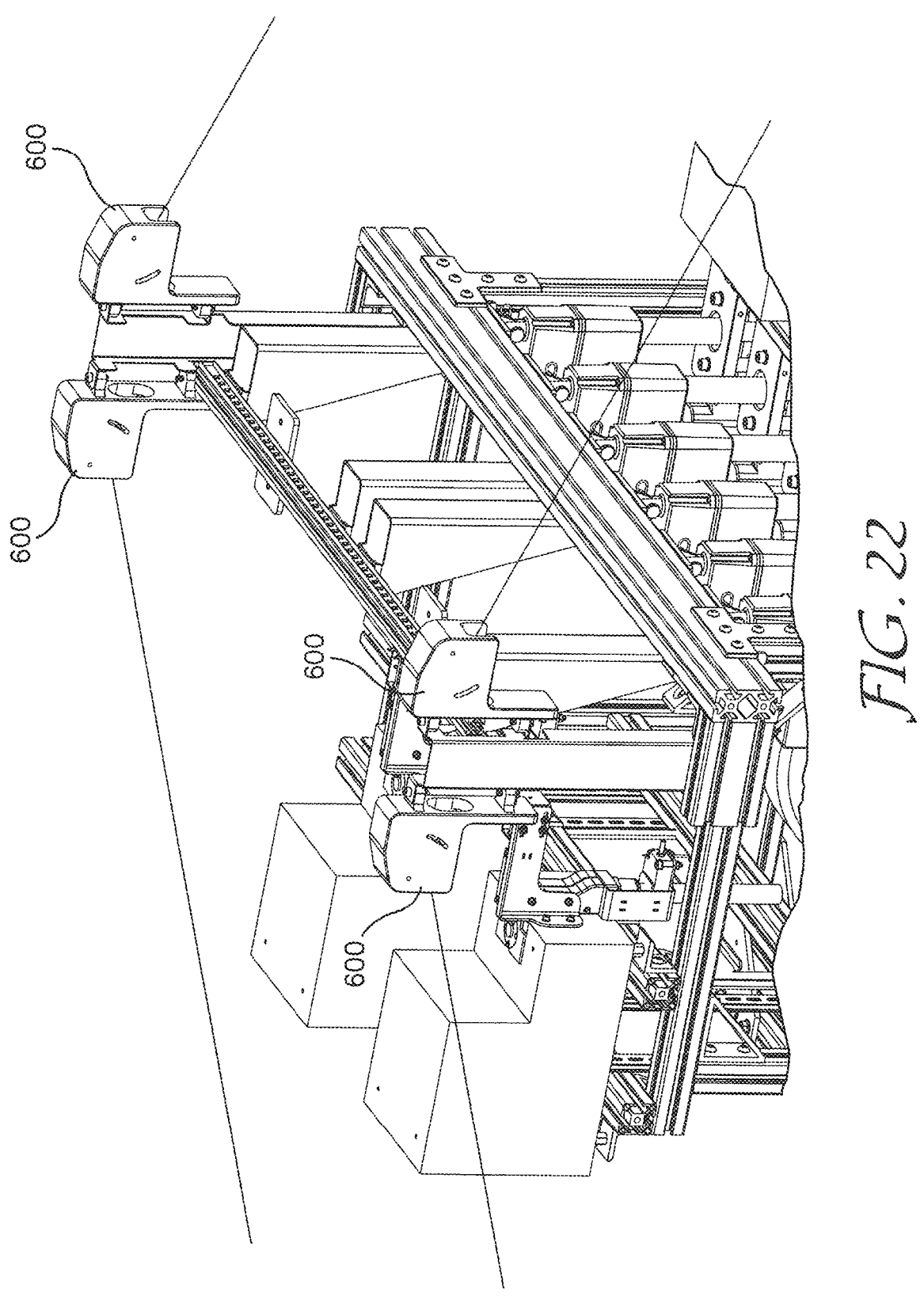
Figure 23:
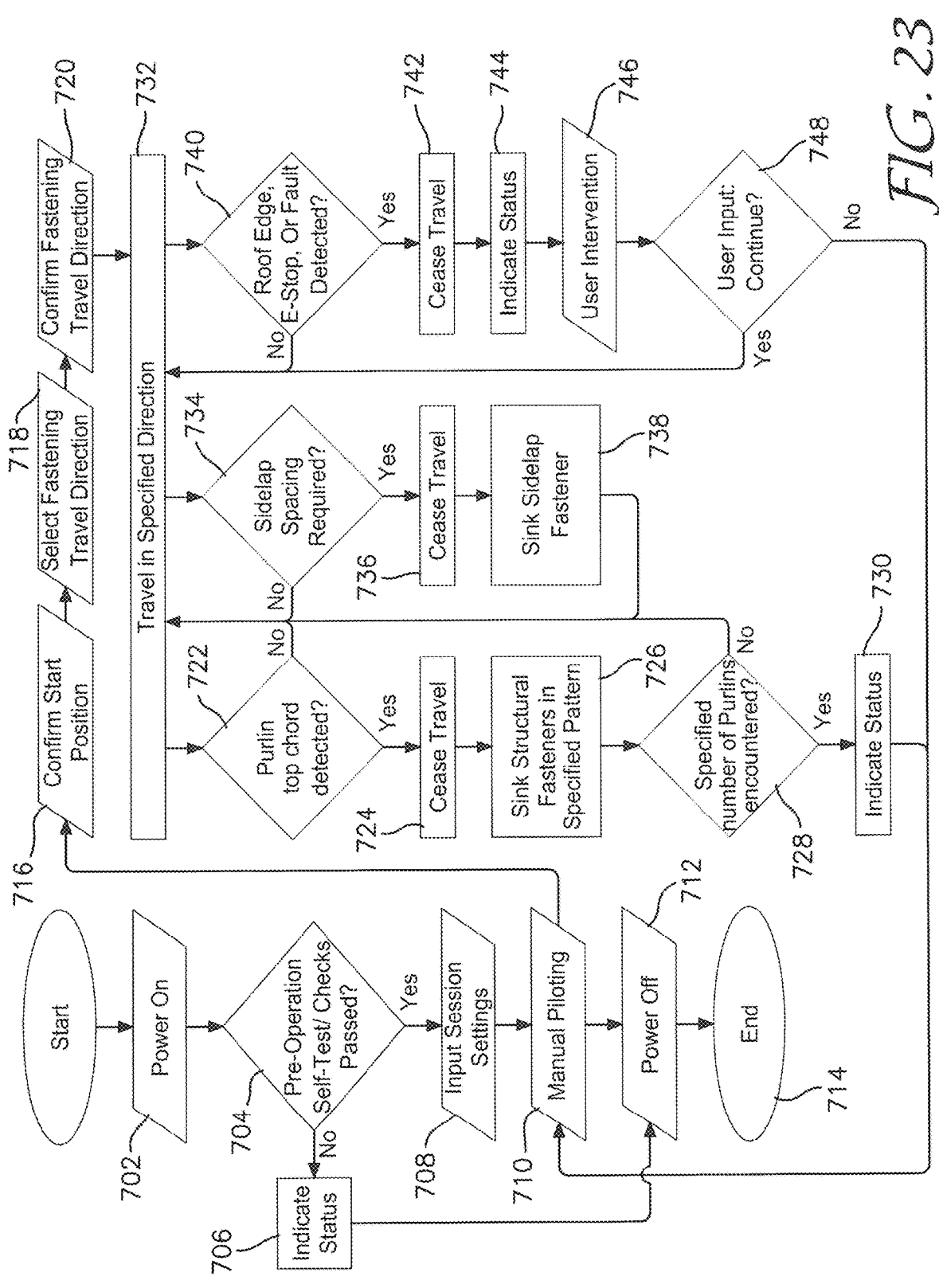
Figure 24:
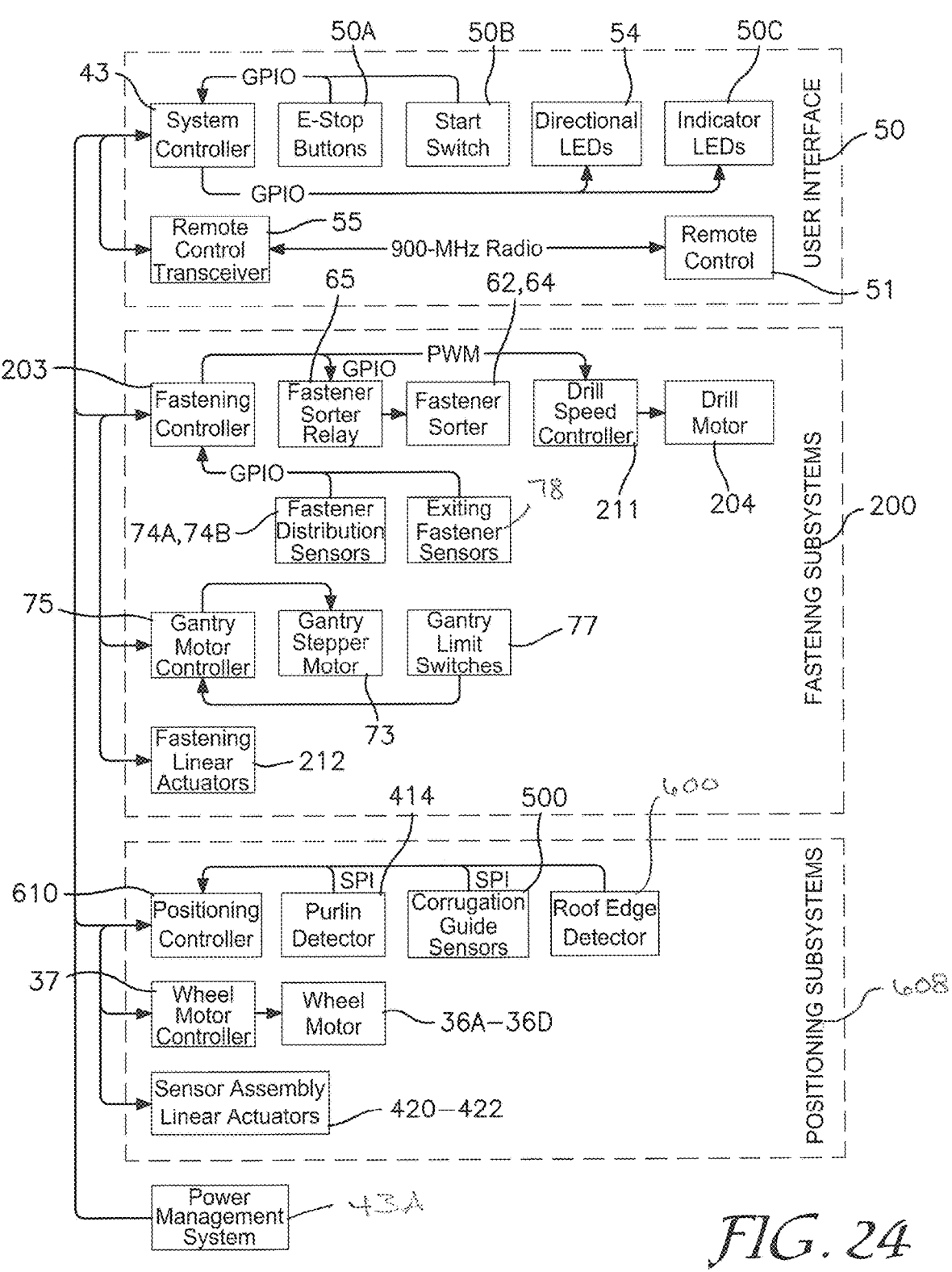
Figure 25:
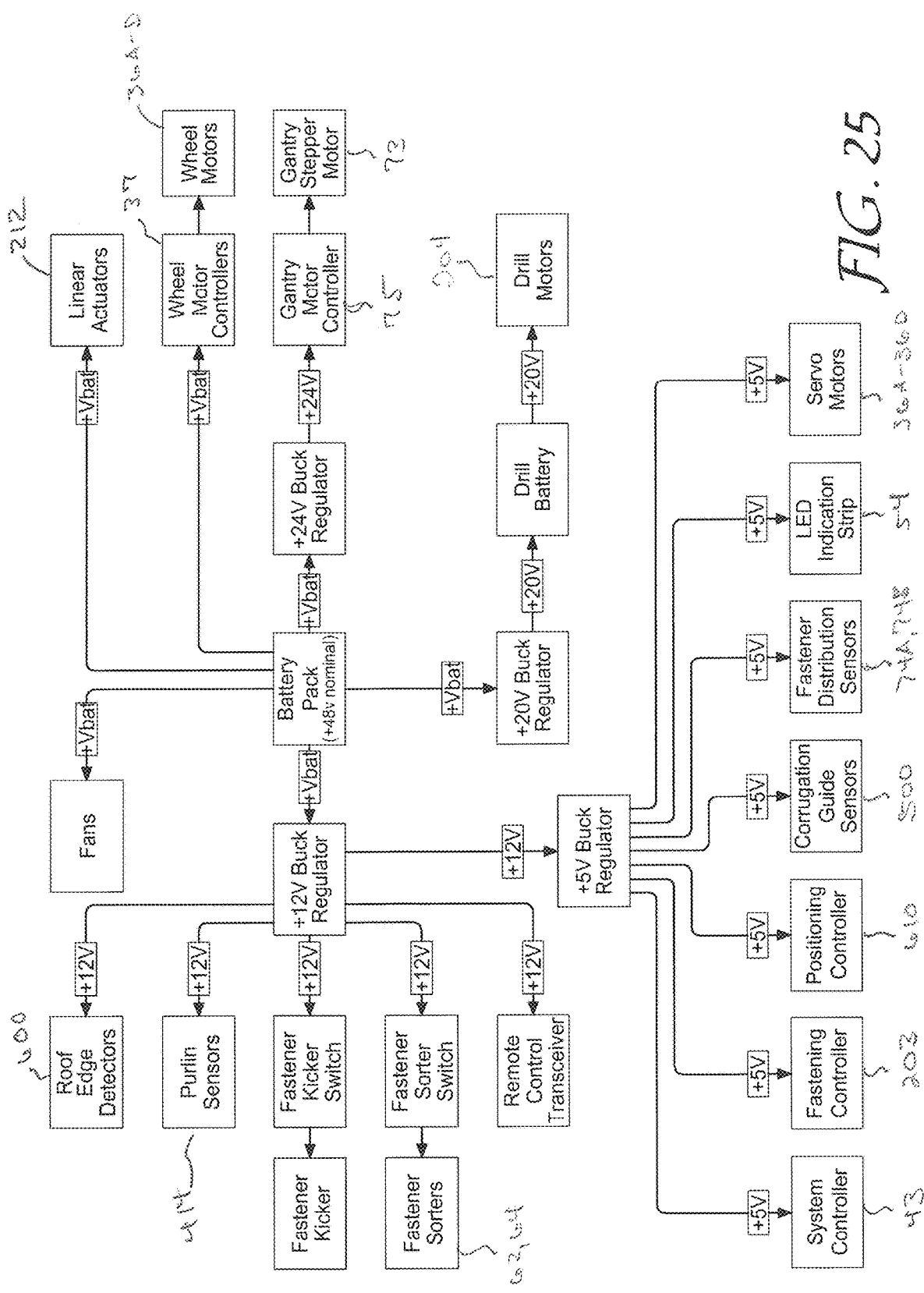
Figure 27:
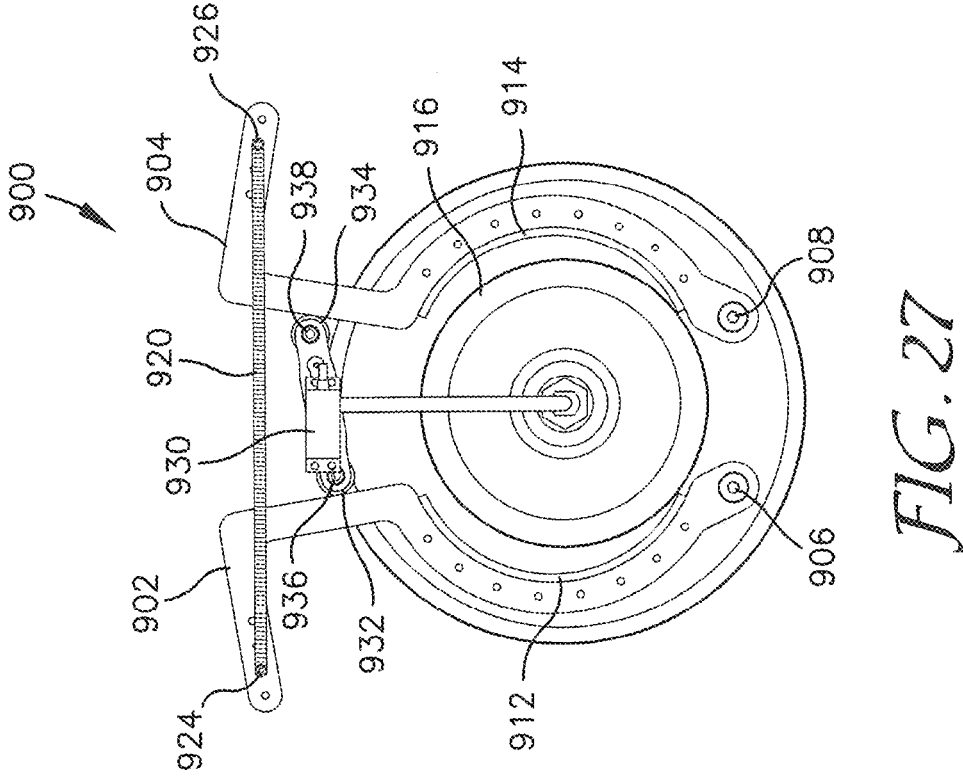
Figure 26:
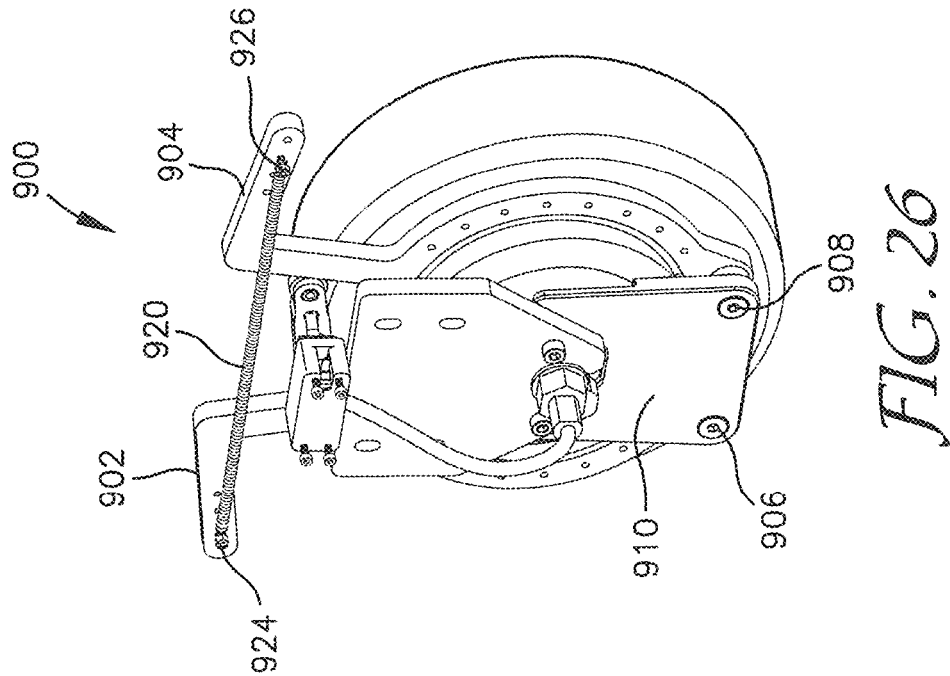

FIG. 16 illustrates a front elevation view of an embodiment of the autonomous system to include the structural member detector sensor assembly in a raised configuration;

FIG. 17 illustrates a side elevation view of an embodiment of a structural member detector sensor;

FIG. 17A illustrates a perspective view of an embodiment of a metal deck structural member detection sensor;

FIG. 18 illustrates a front elevation view of an embodiment of a mechanical swing for detecting fastener heads or other obstacles within a metal deck corrugation;

FIG. 19A illustrates a side elevation view of an embodiment of a mechanical swing prior to contacting a fastener at the bottom of a corrugation;

FIG. 19B illustrates a side elevation view of an embodiment of a mechanical swing upon contacting a fastener at the bottom of a corrugation;

FIG. 19C illustrates a perspective view of an embodiment of a disc atop the mechanical swing in a mode prior to interrupting the photo sensor;

FIG. 19D illustrates a perspective view of an embodiment of a disc atop the mechanical swing in a position that is interrupting the photo sensor;

FIG. 20 illustrates a side elevation view of an embodiment of the corrugation guide sensor assembly in position beneath the autonomous system;

FIG. 21 illustrates a front elevation view of an embodiment of a corrugation guide sensor disposed within a corrugation;

FIG. 22 illustrates a perspective view of the location of the metal deck edge detection sensors upon the autonomous system;

FIG. 23 illustrates a flow diagram of the operation of the autonomous system;

FIG. 24 illustrates a hardware block diagram of the subsystems of the autonomous system;

FIG. 25 illustrates a block diagram of an embodiment of the power supply architecture of the autonomous system;

FIG. 26 illustrates a perspective view of an embodiment of an emergency brake system for the autonomous system; and FIG. 27 illustrates a side elevation view of an embodiment of an emergency brake system for the autonomous system.

DETAILED DESCRIPTION

The following description is merely exemplary in nature and does not limit the present teachings, application, or uses. Throughout this specification, reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings.

The drawings furnished are intended to illustrate and plainly disclose presently envisioned embodiments to one of skill in the art but are not intended to be manufacturing level drawings or renditions of final products and may include simplified conceptual views to facilitate understanding or explanation. Also, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps can be employed.

When an element, object, device, module, apparatus, component, region or section, etc., is referred to as being "on", "engaged to or with", "connected to or with", or "coupled to or with" another element, object, device, module, apparatus, component, region or section, etc., it can be directly on, engaged, connected or coupled to or with the other element, object, device, module, apparatus, component, region or section, etc., or intervening elements, objects, devices, modules, apparatuses, components, regions or sections, etc., can be present. In contrast, when an element, object, device, module, apparatus, component, region or section, etc., is referred to as being "directly on", "directly engaged to", "directly connected to", or "directly coupled to" another element, object, device, module, apparatus, component, region or section, etc., there may be no intervening elements, objects, devices, modules, apparatuses, components, regions or sections, etc., present. Other words used to describe the relationship between elements, objects, devices, modules, apparatuses, components, regions, or sections, etc., should be interpreted in a like fashion (e.g., "between" versus "directly between," "adjacent" versus "directly adjacent," etc.).

As used herein the phrase "operably connected to" will be understood to mean two are more elements, objects, devices, modules, apparatuses, components, etc., that are directly or indirectly connected to each other in an operational and/or cooperative manner such that operation or function of at least one of the elements, objects, devices, modules, apparatuses, components, etc., imparts or causes operation or function of at least one other of the elements, objects, devices, modules, apparatuses, components, etc. Such imparting or causing of operation or function can be unilateral or bilateral.

As used herein, the term "and/or" includes all combinations of one or more of the associated listed items. For example, A and/or B includes A alone, B alone, or both A and B. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Although the terms first, second, third, etc., can be used herein to describe various elements, objects, devices, modules, apparatuses, components, regions, or sections, etc., these elements, objects, devices, modules, apparatuses, components, regions, or sections, etc., should not be limited by these terms. These terms may be used only to distinguish one element, object, device, module, apparatus, component, region, or section, etc., from another element, object, device, module, apparatus, component, region, or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because varying and different embodiments may be made within the scope of the concept(s) taught herein, and because many modifications may be made in the embodiments described herein, it is to be understood that the details herein are to be interpreted as illustrative and non-limiting. The following description is of various exemplary embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

In the following description, certain specific details are set forth to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Type B roof deck is produced in a variety of thicknesses to include 22, 20, 18 and 16 gauges by vendors such as Verco® and Vulcraft®. 22 gauge is the lightest weighing 1.9 pounds per square foot while 16 gauge is the heaviest weighing 3.54 pounds per square foot. Type B roof deck are 1.5 inches deep and 36 inches wide. It is normally used in span conditions under 10 feet.

The structural members include truss purlins which are horizontal open-web structural members, typically made of light gage roll-formed steel, that are used in a metal deck system to support the decking and distribute the load across the main roof beams. The structural members are a metal support member that runs perpendicular to the main frames and provide support for the metal deck sheets, commonly found in building construction. The system disclosed herein can drive structural fasteners into the truss purlins.

A bar joist is a type of pre-fabricated steel structural member, also called an open web joist, which consists of a top and bottom chord connected by a web of diagonal bars, typically used to support metal decks in large spans due to its lightweight and efficient design; essentially, it is commonly a truss made with a continuous bent rod forming the web between the chords, allowing for long spans between support points. The system disclosed herein can drive structural fasteners through the top chord of a bar joist.

As regards fasteners that are used in the system as disclosed, are sidelap and structural fasteners. Sidelap fasteners are for connecting the sidelaps of adjacent steel deck sheets. The head of the fastener allows for installation with mechanized screw tooling. These fasteners drill through the two layers of steel deck prior to the threads engaging and drawing the sheets together. Typical sizes that are utilized in the system are self-drilling screws (SDS) #10-16×0.75 for sidelaps and either SDS #12-14×1.25 or SDS #12-14×1.5.

Figure 1:
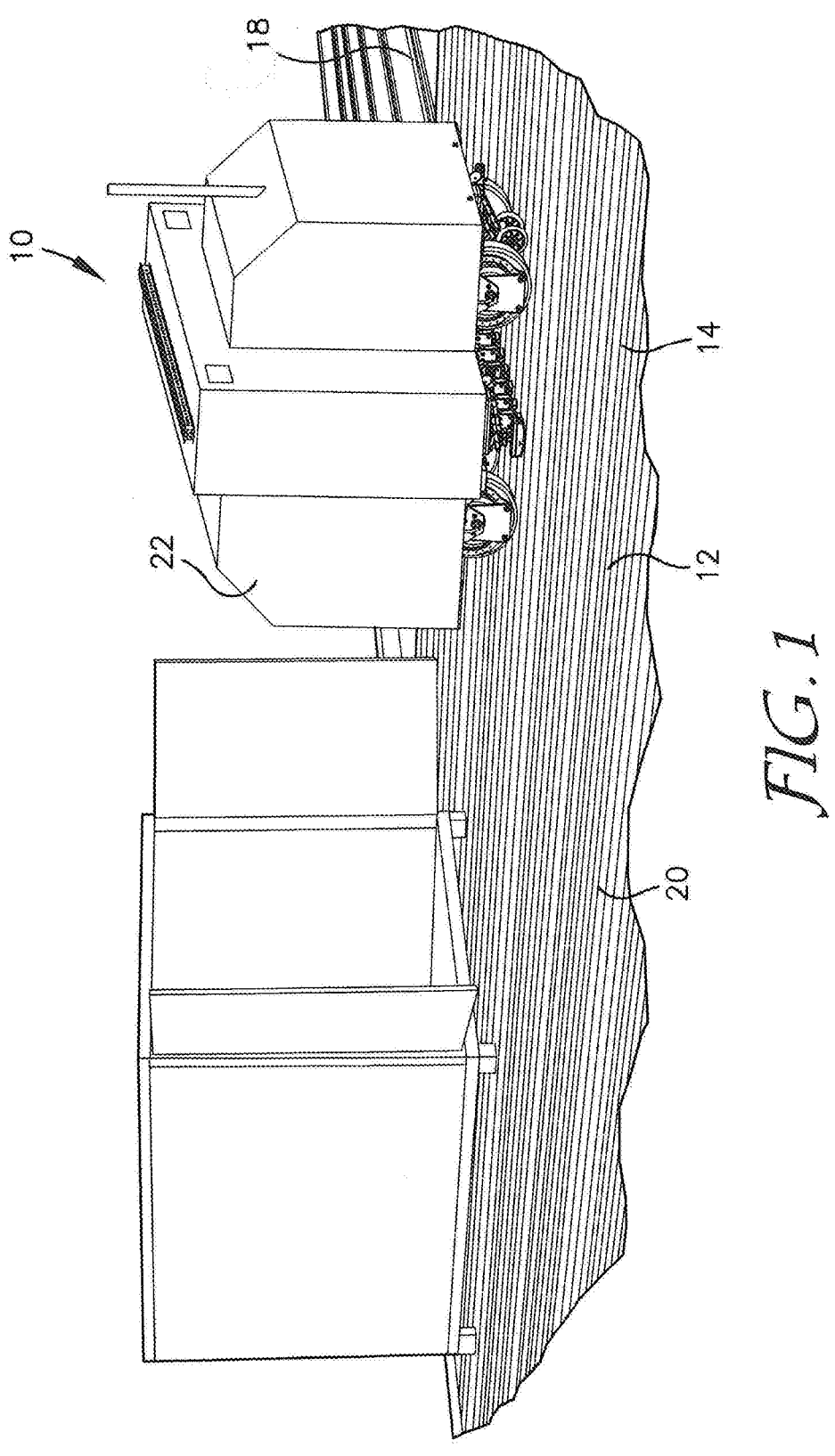
FIG. 1 illustrates an embodiment of the autonomous system positioned upon a corrugated metal deck.
Figure 2:
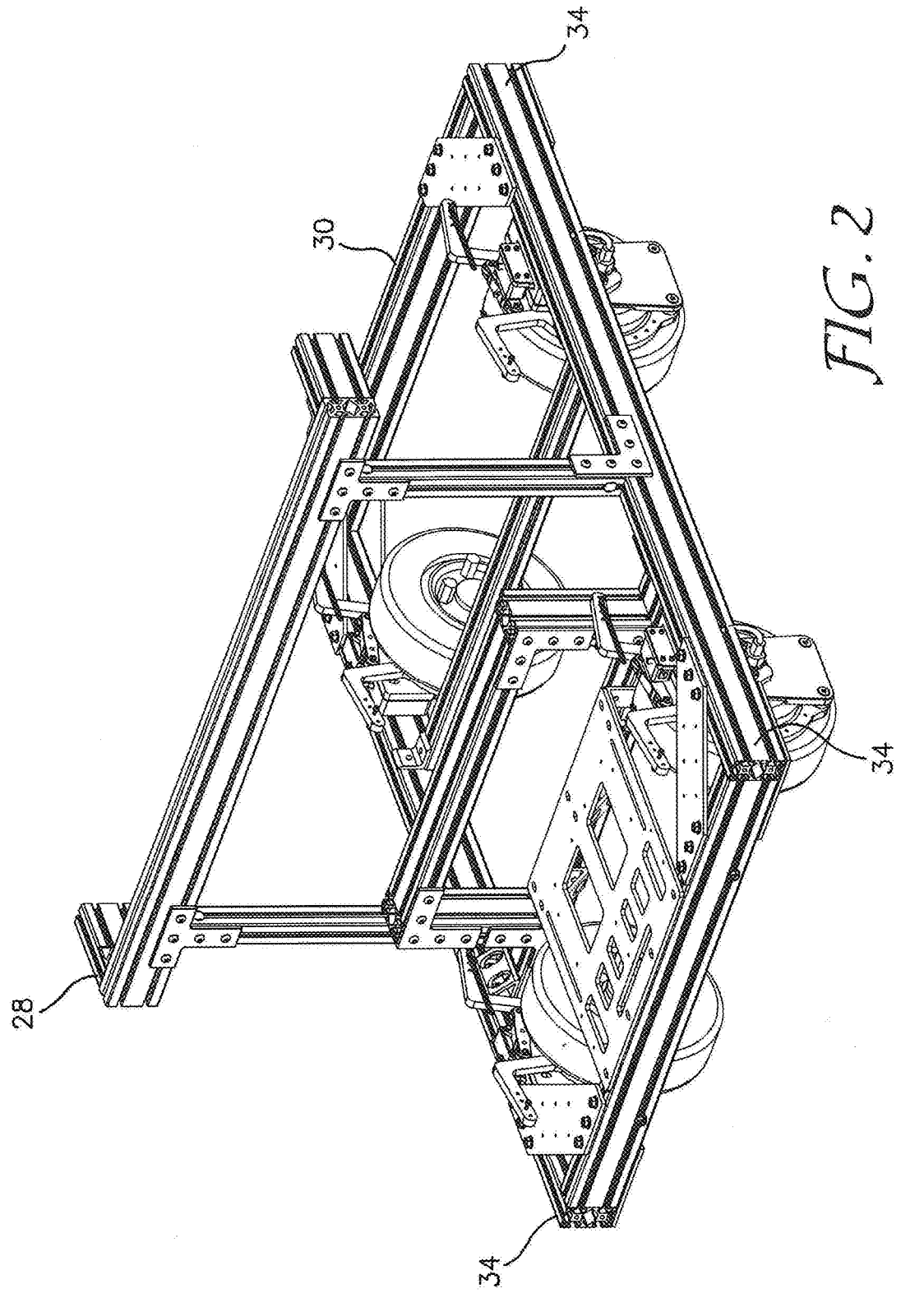
FIG. 2 illustrates an embodiment of the frame members of the autonomous system.

As illustrated at FIG. 1, the autonomous attachment system 10 disclosed herein is for securing a metal deck sheet 12 with corrugations 14 to structural members 18 of a building 20 includes a motorized wheeled carriage 22 for translation along the metal deck 12. As illustrated at FIG. 1, the autonomous attachment system 10 preferably utilizes rectangular tube stock 28 as the platform 30 upon which the other systems (disclosed in detail below) are mounted. Stock other than rectangular tube stock is also contemplated by this disclosure.

The rigidity of rectangular tube stock 28 is critical to the proper functionality of the autonomous attachment system 10. A preferred embodiment also utilizes lifting locations 34 for use should the autonomous attachment system 10 require manual repositioning assistance by the operator. In at least one embodiment the lifting locations utilize retractable handles 34 that are preferably configured to collapse into the rectangular tube stock 28 when not in use.

Figure 3:
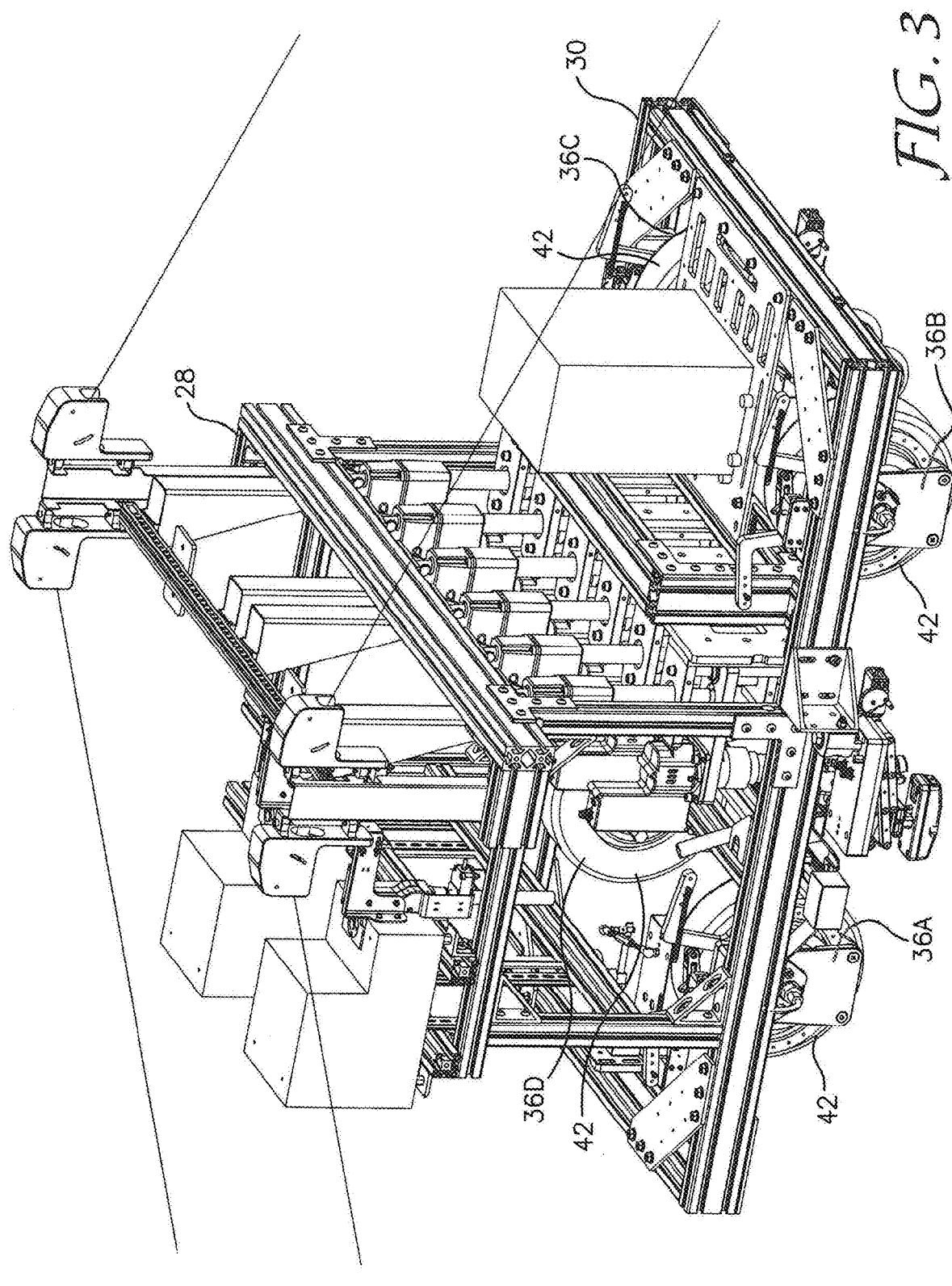
FIG. 3 illustrates an embodiment of the componentry of the assemblies of the autonomous system.

As illustrated at FIG. 3, a total of four wheeled motor assemblies 36A-36D support the platform 30 on tires 42. The wheel motor assemblies are battery powered, and each wheel motor assembly can be independently controlled to allow the autonomous attachment system 10 to turn about a center of rotation. The motor assemblies preferably include a built-in encoder, are IP rated, utilize airless tires and each wheel motor assembly can carry roughly two hundred pounds of weight. An exemplary wheel motor assembly for this application is produced by UU Motor Technology Company under part No. SV8H11 and includes an 11-inch wheel with a solid rubber tire 42 with a 1000 Watt rated hub motor with a built-in encoder and a rate power consumption of 35 Amps at 48 volts (peak).

The above referenced exemplary wheel motor assembly is a three-phase brushless DC motor, which must be commutated (the process of electronically switching the current between the motor phases at the right time to maintain consistent torque and rotation, essentially directing the power to the appropriate coils to keep the motor turning smoothly) by a dedicated brushless DC controller 37 (as detailed at FIG. 24). An exemplary controller for the disclosed autonomous attachment system 10 is produced by Odrive Pro and has a total of ten 58-volt inputs, can handle up to 70 amps of current, utilizes a controller area network bus, can receive Hall effect sensor magnetic coder inputs and is capable of precise angular position control.

Because the disclosed system 10 incorporates many features and requires oversight of many sensors, battery charge levels, light displays, power output, drill torque, etc., a system controller 43 is required as well as a power management system 43A as illustrated at FIG. 24. The system controller 43 is preferably a general-purpose input/output microcontroller board capable of interfacing with all the peripherals within the user interface subsystem. The controller board 43 preferably utilizes a controller area network bus support for CAN communication with all other autonomous attachment system 10 components. The system controller 43 also preferably includes a USB interface, power connector, and controller area network transceiver for convenient use in the distributed architecture of the autonomous attachment system 10. An exemplary system controller 43 is the Feather M4 Board produced by Adafruit® Industries under part No. 4759; however, the use of system controllers sold by other vendors is contemplated by this disclosure.

Figure 4:
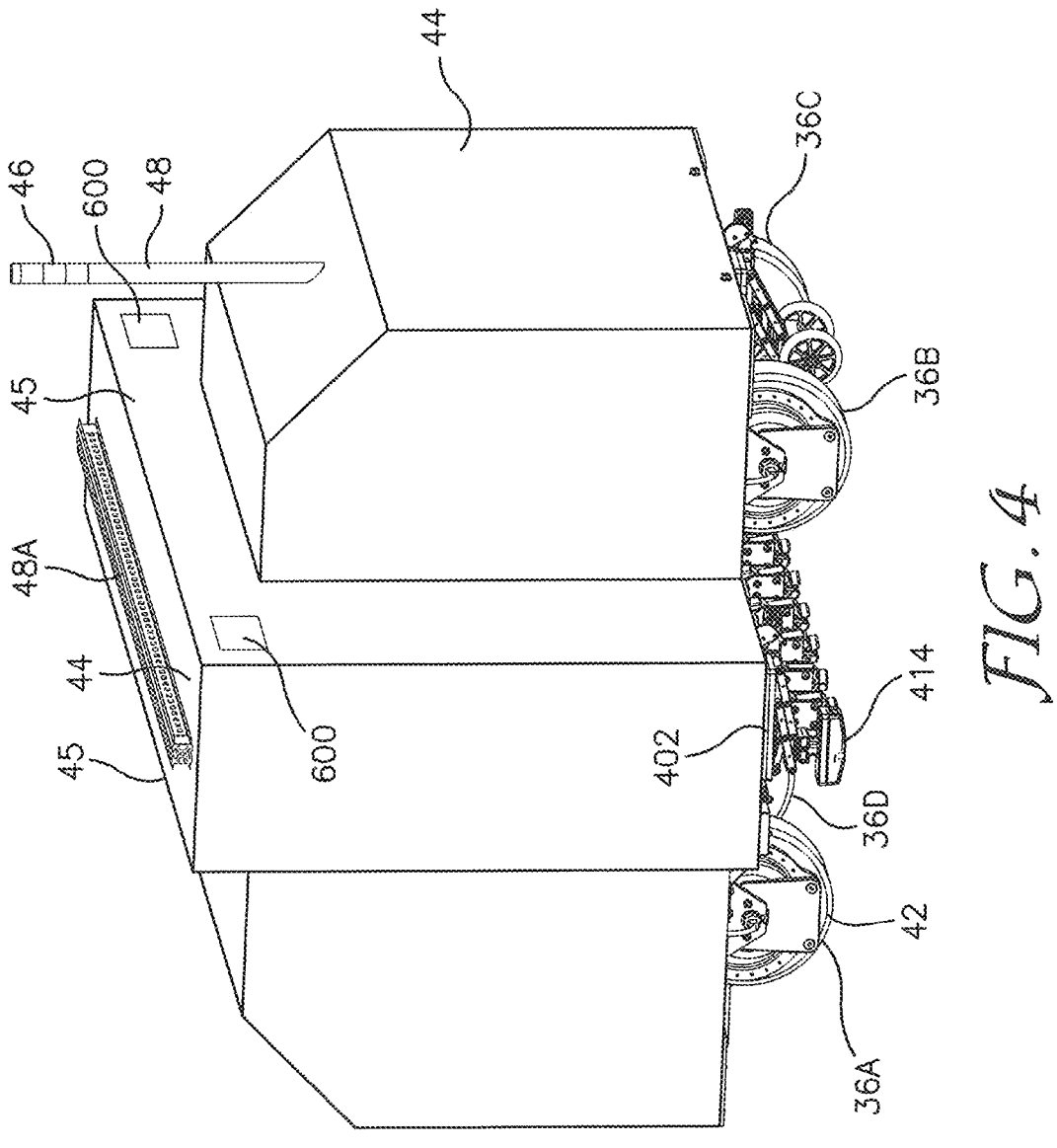
FIG. 4 illustrates a perspective side view of an embodiment of the enclosure of the autonomous system.

In a preferred embodiment, the autonomous attachment system 10 as shown at FIG. 4, includes a removable enclosure 44 to protect the various components located atop the platform 30 and mounted beneath the platform. Accessible from the exterior of the enclosure 44 are emergency stop buttons located on both sides of the autonomous attachment system 10. The system 10 also utilizes a status indicator light bar 48A disposed atop the enclosure 44 and/or lights 46 on a mast 48 as illustrated at FIG. 4. A variety of colored lights on the light bar 48A or colored lights 46 on the mast 48 provide an indication of the status of the autonomous attachment system 10 to include power state (on/off), mode (fastening vs. travel mode), fault state (generic) and pattern completion (yes/no).

Also detachably mounted upon one of the sides of the enclosure 44 is a user interface (not shown), that allows an operator to interact and program the autonomous system 10. The user interface subsystem 50 includes a handheld module 51 and among other features, an emergency stop button 50A, a start switch 50B, and indicator lights 50C as detailed at FIG. 24.

A preferred embodiment also employs direction of travel lights 54, as illustrated at FIG. 24, that are displayed on the autonomous system 10 beneath the lower edge of the enclosure 44. The user interface 50 requires a remote-control transceiver 55 for communication with the autonomous attachment system 10. An exemplary remote-control transceiver 55 is produced by Fort Robotics™ and has a line-of-sight range of 1.2 miles when operating at 900 MHz. The Fort Robotics™ remote control transceiver 55 also provides CANopen interface to facilitate integration with the disclosed autonomous system 10.

Figure 5:
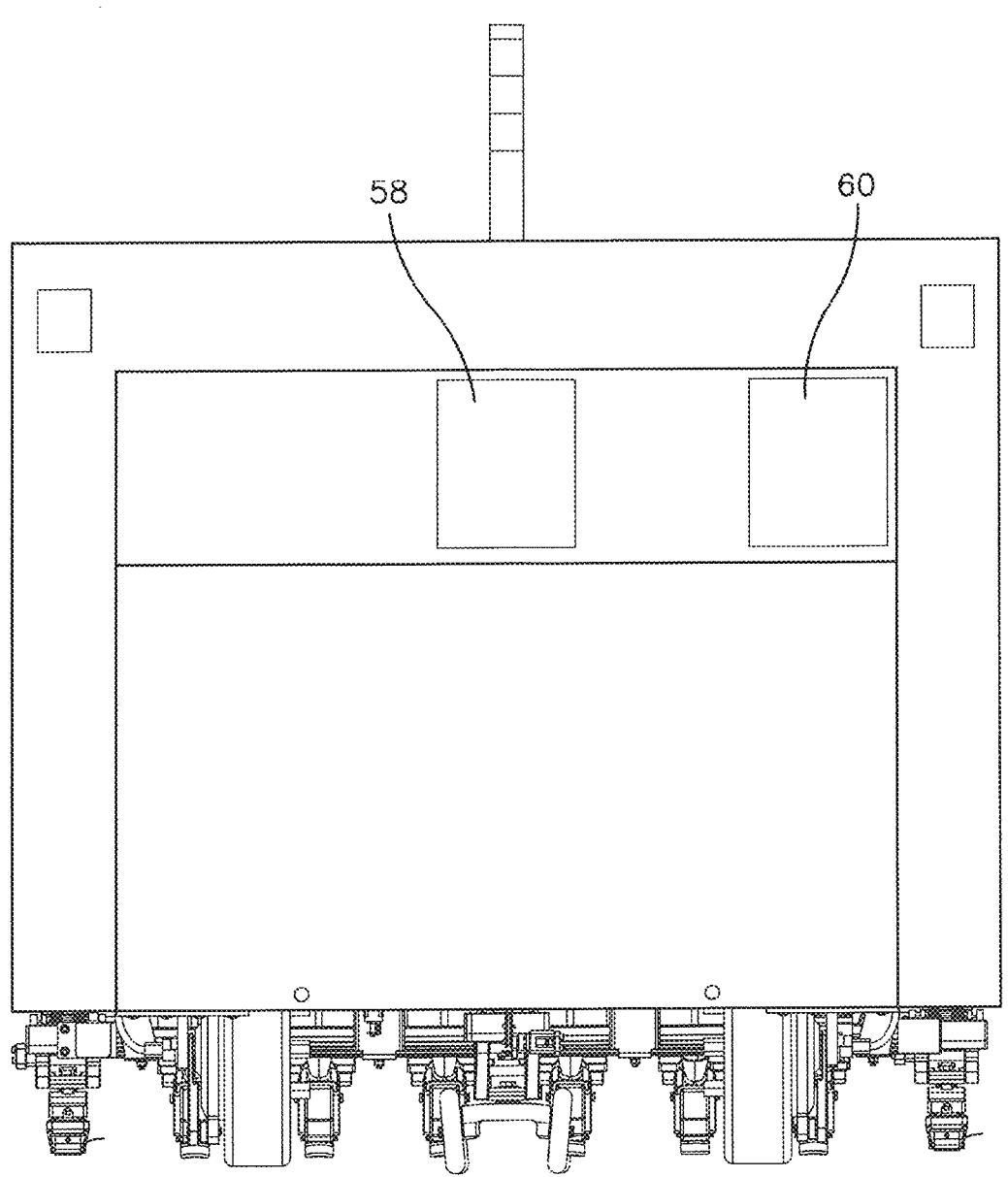
FIG. 5 illustrates a front elevation view of an embodiment of the fastener hopper access doors for the autonomous system.
Figure 6:
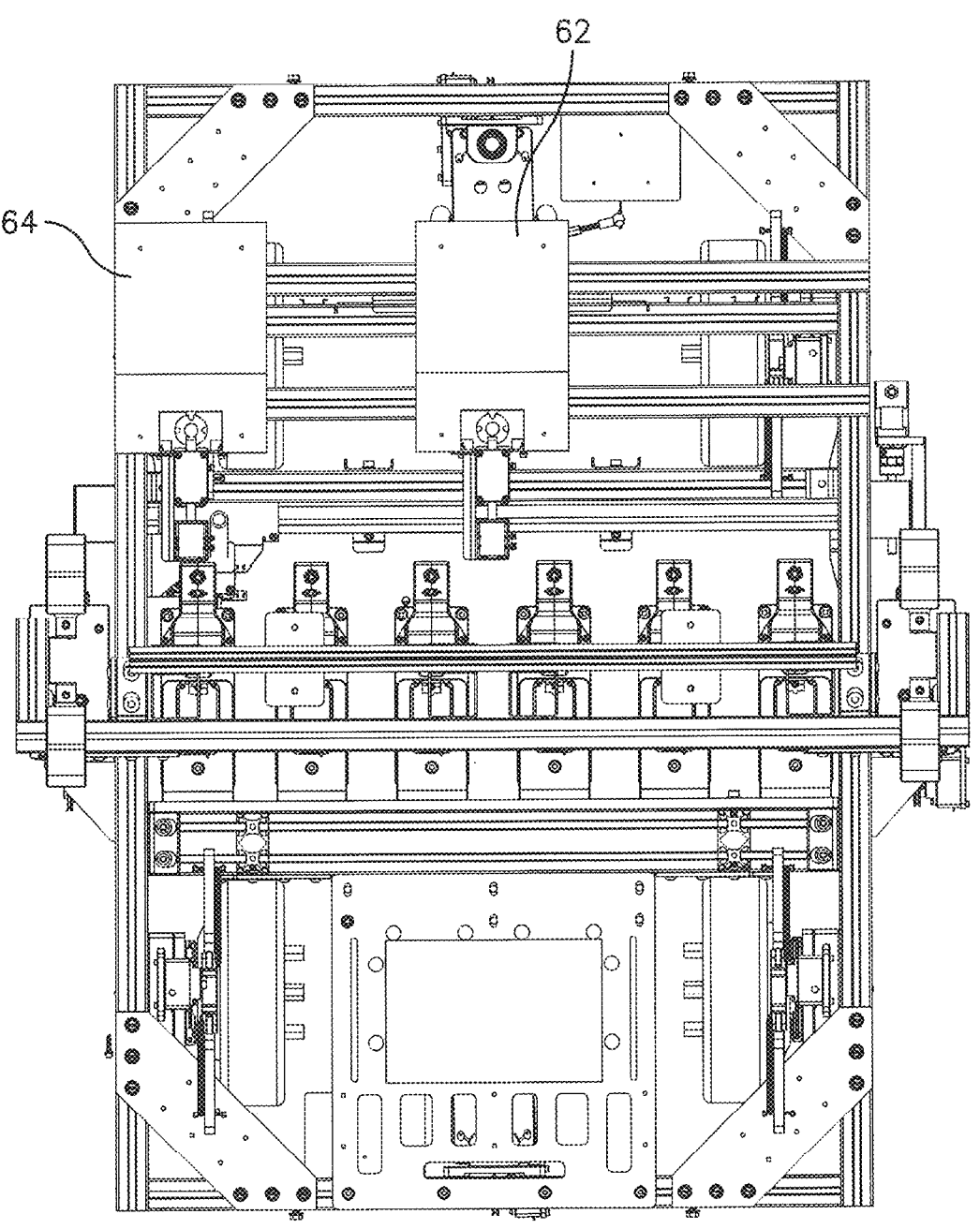
FIG. 6 illustrates a plan view of the frame and fastener hoppers of the autonomous system.
Figure 7:
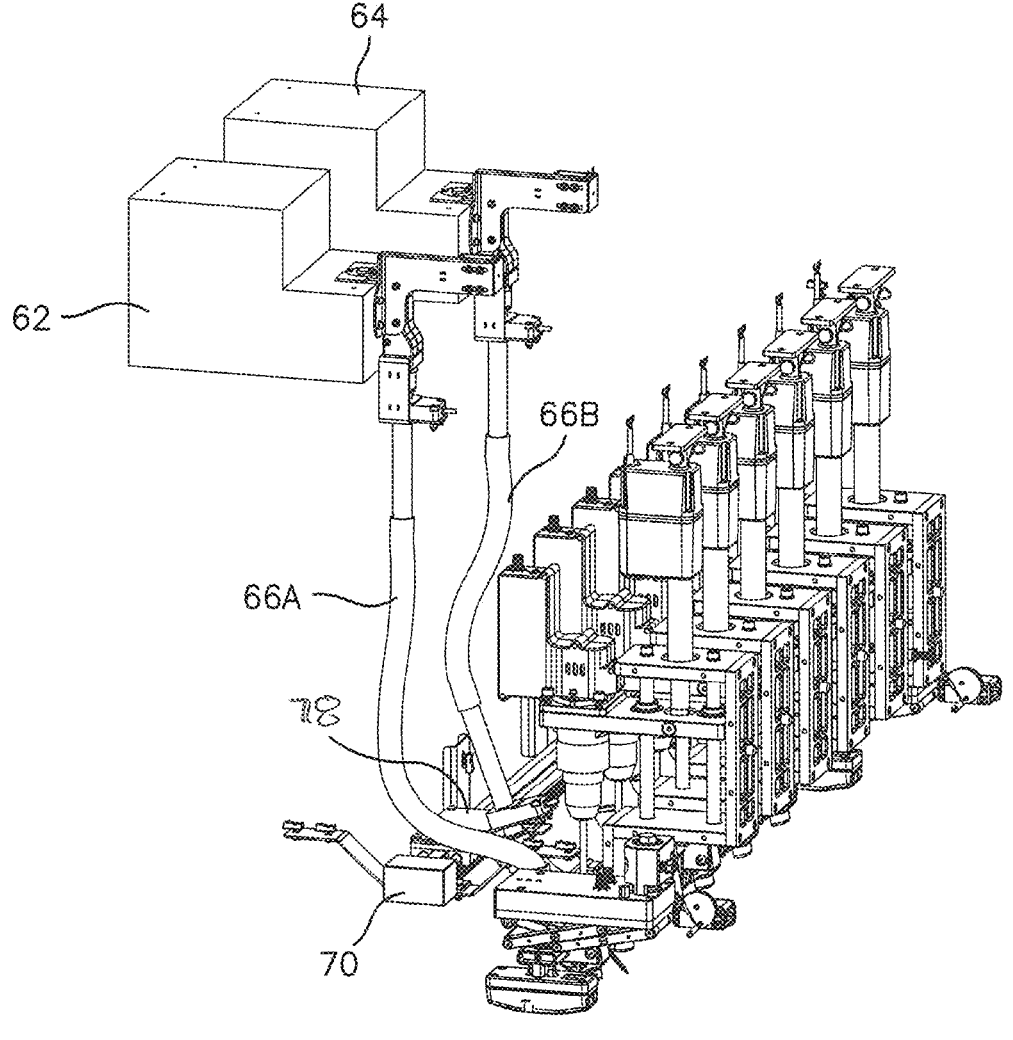
FIG. 7 illustrates a perspective view of an embodiment of the fastener movement system and fastening equipment build assembly.
Figure 8:
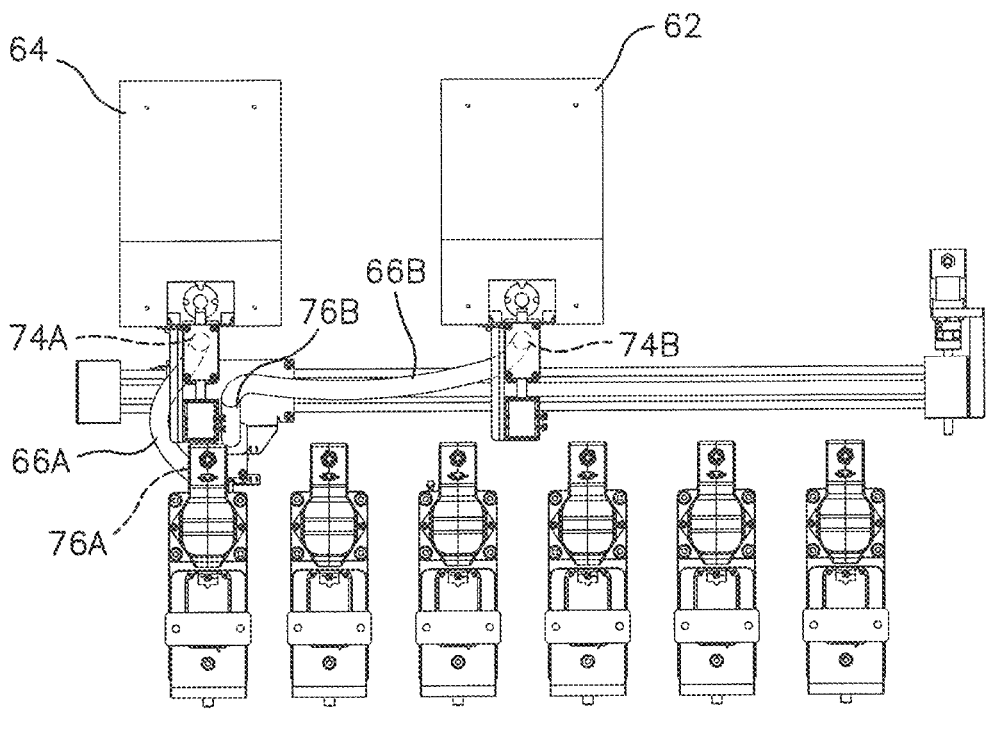
FIG. 8 illustrates a plan view of embodiments of the hoppers, gantry, sled and drill assemblies of the fastener management system.
Figure 9:
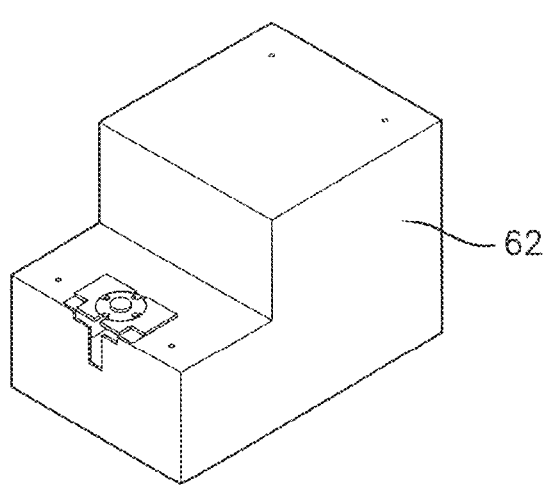
FIG. 9 illustrates a perspective view of an embodiment of a screw sorter for the fastener management system.

As illustrated at FIG. 5, structural and sidelap fasteners are loaded into separate screw sorter hoppers 58, 60 by the operator and managed independently by the system 10. As illustrated at FIGS. 6, 7, and 8, the fastener sorters 62, 64 for each hopper 58, 60 orient each of the fasteners. An exemplary screw sorter is Model #DRFF-535 produced by Delta Regis® tools as illustrated at FIG. 9. Screw sorters available from other vendors are, however, also contemplated for use with this autonomous attachment system 10.

Loose fasteners are placed in for example, 500 cubic centimeter hoppers 58, 60 by an operator. Inside of the screw sorter, they are picked out of the hopper, oriented head-up, and loaded into a chute. The operation of the fastener sorters 62, 64 is preferably controlled by a fastener sorter controller 65 (as illustrated at FIG. 24). The fastener sorter controller 65 in one embodiment utilizes a relay module which enables and disables the relay thereby providing binary on/off control of the sorter. At the exit of screw sorters is a steady flow of fasteners lined up to be routed for delivery to each individual drill 204 within the drill assembly 201.

Figure 8A:
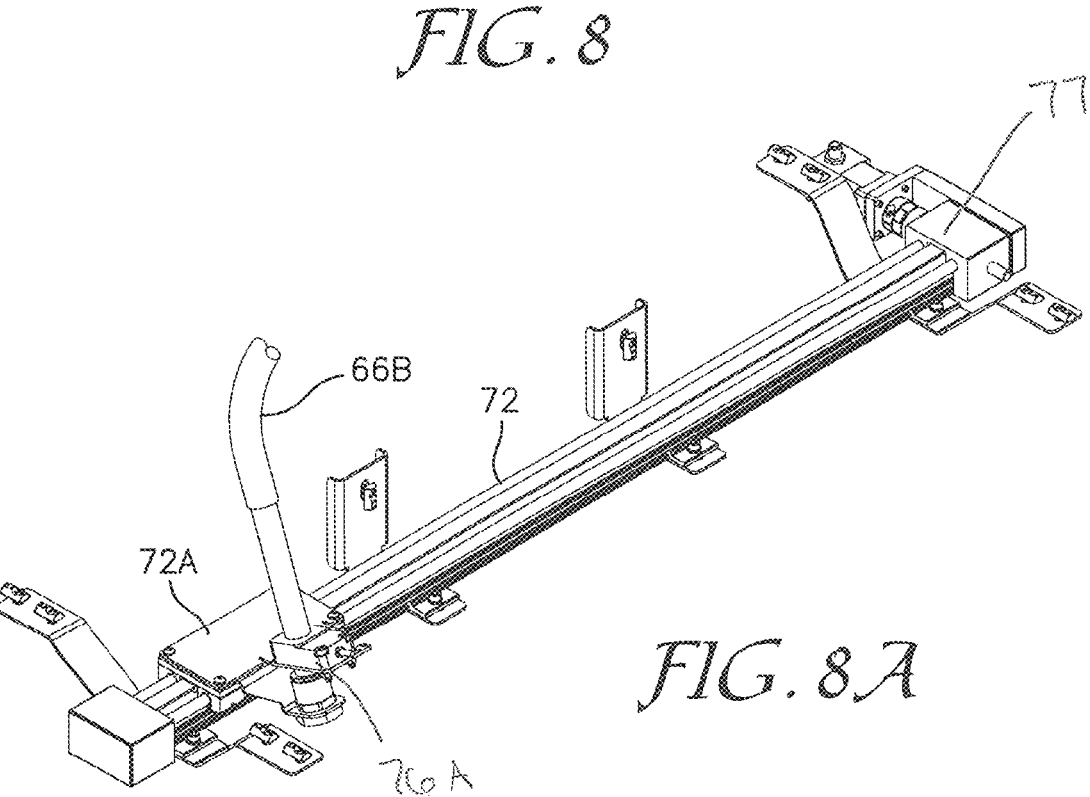
FIG. 8A illustrates a perspective view of an embodiment of the gantry and sled of the fastener management system.

As seen in FIGS. 7, 8 and 8A, a pair of feed tubes 66A, 66B lead from the screw sorters 62, 64 to the fastener distribution assembly 70. The feed tubes 66A, 66B are flexible and clear so that should a fastener become lodged within the tubes they can easily be seen and quickly dislodged to allow continuation of the attachment process.

As illustrated at FIG. 7, the disclosed autonomous attachment system 10 utilizes a fastener distribution assembly 70, a mechanical device that utilizes linear translation to deliver the fasteners in a controlled manner to specific locations. Fastener distribution assemblies are often used in automated systems where fasteners need to be distributed or positioned precisely for assembly or installation processes. The fastener distribution assembly 70 produces motion in a straight line, as opposed to the rotational motion produced by a typical motor.

The fastener distribution assembly 70 converts electrical energy into linear movement. As will be discussed in greater detail below, the disclosed autonomous attachment system 10 will contain a set number of individual fastening subsystems. For the most efficient consumption of fasteners, only fastener subsystems that require a fastener at any given time will be provided with one. This is dictated by a fastening pattern which is selected by the operator at the beginning of a fastening session.

By the time each fastener is ready to exit the sorter 62, 64, the sled 72A has moved along its rail 72 to line up with the correct fastening subsystem. An exemplary rail 72 and sled 72A for the disclosed autonomous attachment system 10 is available under part No. ZLW104OS-8 made by Igus®, Inc as illustrated at FIG. 8A; however, the use of sledded rails, also referred to as a linear actuator, from other vendors is also contemplated by this disclosure as this vendor's rail and sled are only exemplary. The Igus® gantry has an 800 mm travel length, which can cover the entire span of the fastening subsystem. Fabricated from lightweight aluminum this rail 72 readily interfaces with a stepper motor for fine control of its sled 72A.

The above referenced Igus® linear actuator 72, 72A does not include a motor 73 (see FIG. 24) for translating the sled 72A; however, an exemplary motor for use in this application is also produced by Igus® Inc under part number MOT-AN-S-060-004-042-M-A-AAA. The gantry stepper motor for the autonomous attachment system 10 is preferably IP65 rated (protected from dust and water). A stepper motor 73 will not work as intended without a corresponding motor driver, so a gantry motor controller 75 is also required (see FIG. 24). An exemplary gantry motor controller 75 is available from Igus® Inc under part No. D1.

This motor controller 75 supplies the requisite amperage (1.8 amps) needed by the Igus® motor controller referenced immediately above. This motor controller 75 can control bipolar and unipolar stepper motors, has built in connections for binary inputs like limit switches, and is CANopen-controllable (based on the controller area network protocol, which uses a CAN bus to allow multiple devices to communicate with each other).

For homing the sled 72A upon power up the autonomous attachment system 10 needs to know when the sled 72A has reached the end of the rail 72. For this purpose, a limit switch 77 (see FIG. 8A) is added to the rail 72 at one end. Again, Igus® Inc provides an exemplary limit switch under part No. P8-AN-2A; however, as previously noted, other vendor products are also contemplated by this disclosure.

To address fastener feeding issues and ensure fasteners make it to their destination at the correct time, sensors are needed to check for the presence of a fastener in three crucial locations. First, at the exits 74A, 74B of the fastener sorters 62, 64 as best illustrated at FIGS. 8 and 24. Second 76A, 76B, at the gantry sled 72A, as illustrated at FIGS. 8 and 8A, and third at the entrance to the fastener release mechanism 78 within a fastening unit as best illustrated at FIG. 10.

An exemplary sensor to determine the presence of a fastener are optical sensors produced by the Omron Corporation under part No. EE-SX461-P11. With this sensor, and many types of sensors can provide the necessary sensing capabilities, an infrared beam shines between the tines of a fork shaped member. As a fastener travels through the clear plastic tubing, it will break the infrared beam and indicate to the fastening controller that a fastener has been detected.

The fastening subsystem 200, as illustrated in schematic format at FIG. 24, comprises individual units that install fasteners into the deck and/or purlins through the top layer of the deck 12 as well as all the associated systems to include among others fastening linear actuators, fastener sorters and a fastening controller. These units are responsible for sorting the provided fasteners, loading them into the drill hardware, and driving them into the deck and as programmed into structural members. The fastening controller 203 is responsible for communicating via CANopen with the system controller 43. The fastening controller 203 is also responsible for driving the fastener supply system hoppers 58, 60 to ensure a continuous supply of fasteners as well as detecting existing fasteners or other obstructions present on the deck. Additionally, the fastening controller 203 manages the drill speed and the translation of the linear actuator 212. An exemplary fastening controller 203 is sold by Adafruit® Industries under Part No. 4759.

Figure 10:
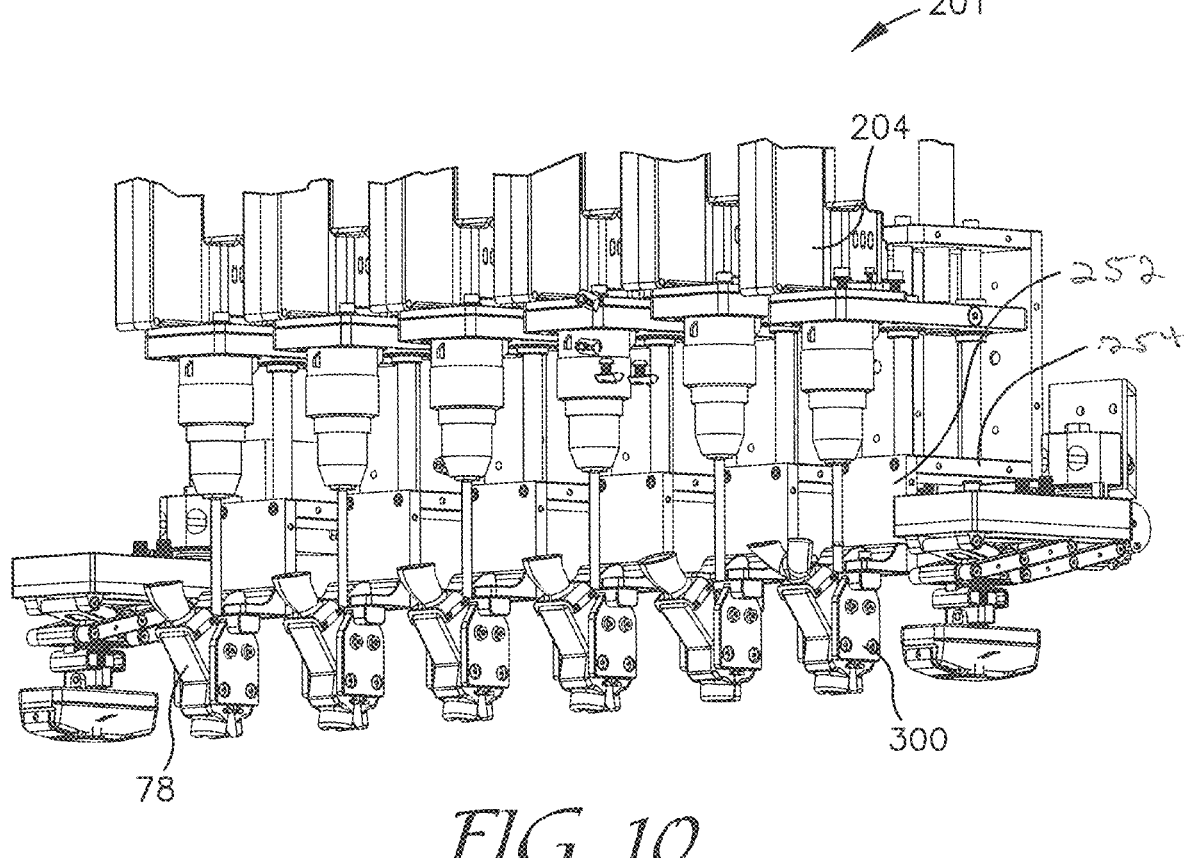
FIG. 10 illustrates a perspective view of an embodiment of a drill and sensor assembly.
Figure 11:
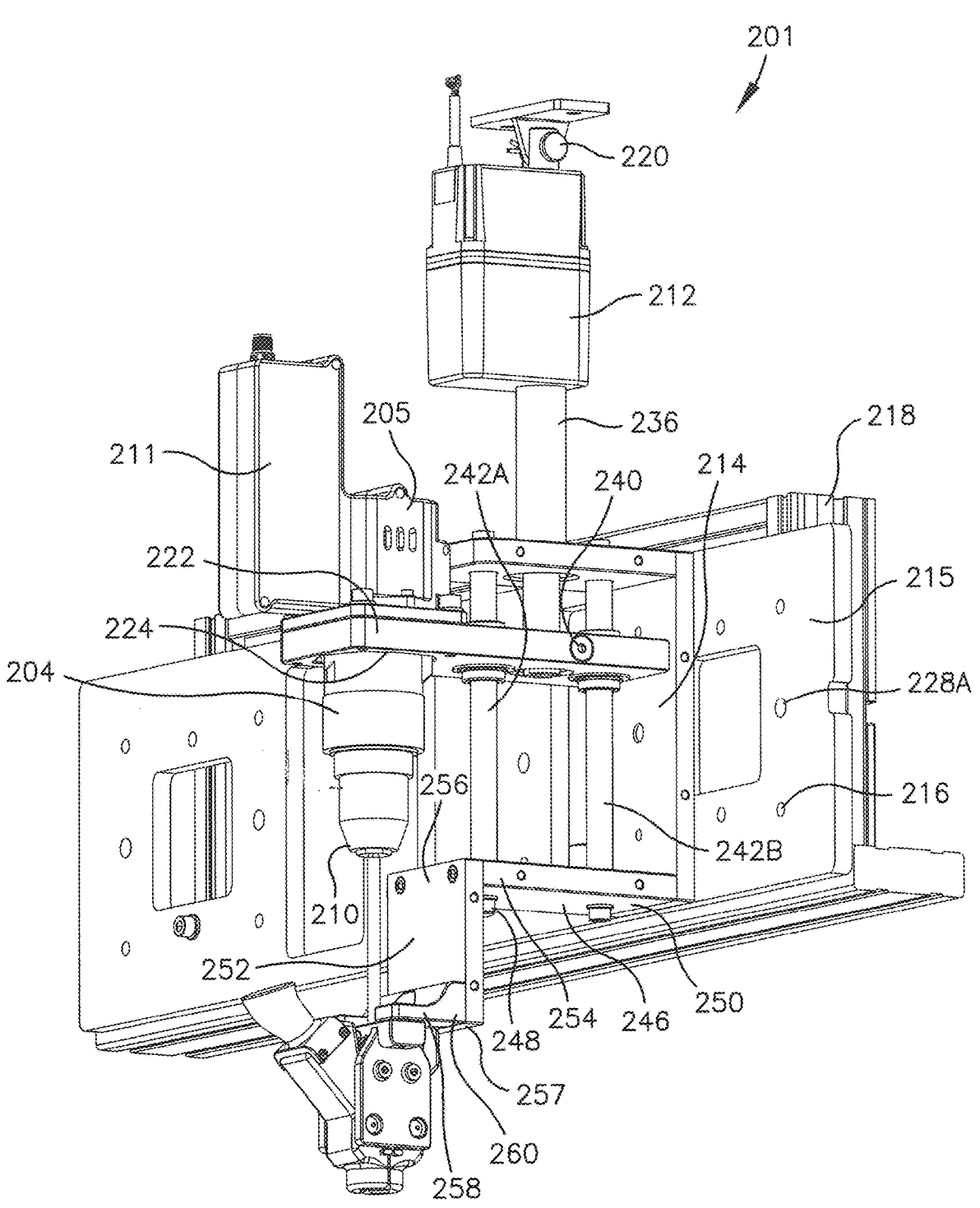
FIG. 11 illustrates a side perspective view of an embodiment of a single drill assembly with an associated linear actuator assembly.

As illustrated at FIG. 10 the disclosed autonomous attachment system 10 also utilizes a plurality of drills 204 for driving the structural and sidelap fasteners. In a preferred embodiment of the disclosed system, there are a total of six drills 204. FIG. 11 illustrates that the drills 204 include a motor and an electronics package 205 and, a chuck 210. To control the speed of the drills 204, the drill trigger is bypassed with a pulse width modulated (PWM) controller module 211. The PWM controller module 211 is hardware for sending a control signal that repeatedly toggles a signal between a HIGH and a LOW state in a consistent pattern. A PWM controller module 211 is wired into the drill 204 in place of the trigger and controls the drill 204 by using PWM outputs from the fastening controller 203.

In a preferred embodiment, the fastening controller 203 controls the electronic clutch setting of the drills 204 and stops plunging of the drills when the specified torque setting is achieved. The clutch setting is adjusted autonomously for the specific needs of the fastener installation and are input by the operator. The clutch settings are calibrated during testing for the specific fastener, B-deck, and structural member to prevent over torque conditions upon fastener installation.

As further illustrated at FIG. 11, a drill motor linear actuator 212 for each of the plurality of drills 204 is secured to an attachment plate 214 that is secured to a backing plate 215 that is secured by fasteners 216 to a rigid frame 218. In a preferred embodiment the top of the linear actuators 212 are retained in position by a clevis pin 220 that can quickly release the linear actuator from the system 10 should replacement of the linear actuator 212 become necessary.

An exemplary fastening linear actuator 212 for this application is produced by Thompson Industries under part number MD12A025-0150XXX2NNSD. The exemplary fastening linear actuator 212 has a 150 mm stroke and can apply up to 56 pounds of downward force which has been shown to be sufficient for the self-drilling tip of the fasteners in this application to engage with the deck, form a hole and allow the fastener to engage. The exemplary fastening linear actuator operates on 12 volts at a maximum draw of 5.2 amps and only draws an amount of power that can reasonably be sourced from the central battery bank for the system 10.

The drill motor fastening linear actuator 212 operates to plunge the drill motor 204 and the chuck 210 downward for advancing a threaded fastener into the structural member 18 of the building 20 or into a sidelap. The plurality of drills 204 each are mounted into a mid-plate 222. Each mid-plate 222 includes an opening 224 through which the drill chuck 210 can pass thereby positioning the drill chuck 210 to protrude beneath the mid-plate 222.

Figure 11A:
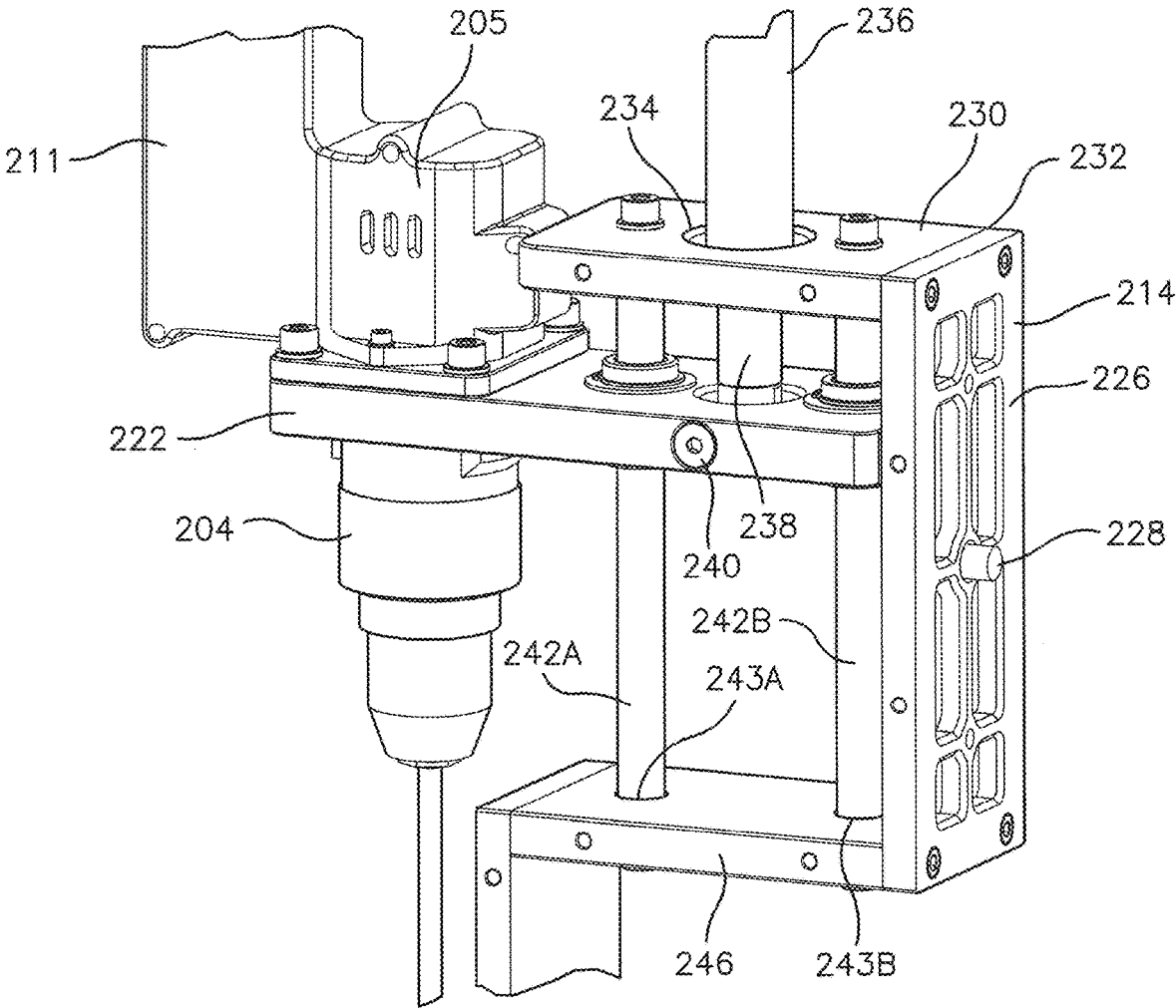
FIG. 11A illustrates a side perspective view of an embodiment of a single drill assembly.

As illustrated at FIG. 11A, the drills 204 are secured with fasteners to the top of the mid-plate 222. The backside 226 of the attachment plate 214 includes a location pin 228 to ensure precision in locating the drill motor and electronics package 205 into a reference hole 228A in the backing plate 215 as illustrated at FIG. 11. The location pin 228 facilitates quick replacement of the entire drill assembly should a replacement be needed. The backing plate 215 also includes a plurality of longitudinally displaced reference holes 228A to accommodate the requisite number of drill motors and electronics packages 204 mounted to attachment plates 214 and using location pins 228.

As illustrated at FIG. 11A, an upper plate 230 spans outwardly from an upper edge 232 of the attachment plate 214. The upper plate 230 includes a through hole 234 through which the plunger 236 of the linear actuator 212 extends downwardly to the mid-plate 222. The tip 238 of the plunger 236, as illustrated at FIG. 11A, is secured in position with a set screw 240 binding the tip of the plunger to the mid-plate 222. The mid-plate 222 also includes two openings through which two slide rods 242A, 242B pass. As illustrated at FIG. 11A, the base 243A, 243B of each of the slide rods 242A, 242B are constrained in position by a lower plate 246 and by set screws 248 (FIG. 11) extending upwardly from the lower surface 250 of the lower plate 246 into the slide rods.

As illustrated at FIG. 11, a vertical plate 252 extends downwardly from an edge 254 of the lower plate 246. The upper end 256 of the vertical plate 252 is anchored by at least two fasteners to an edge 254 of the lower plate 246. A fastener release mechanism mounting plate 258 is mounted proximate the lower edge 257 of the vertical plate 252. The fastener release mechanism mounting plate 258 extends horizontally outward from the vertical plate 252 and includes a thickened backing feature 260 that increases the rigidity of the connection between the vertical plate 252 and the fastener release mechanism mounting plate 258.

Figure 12:
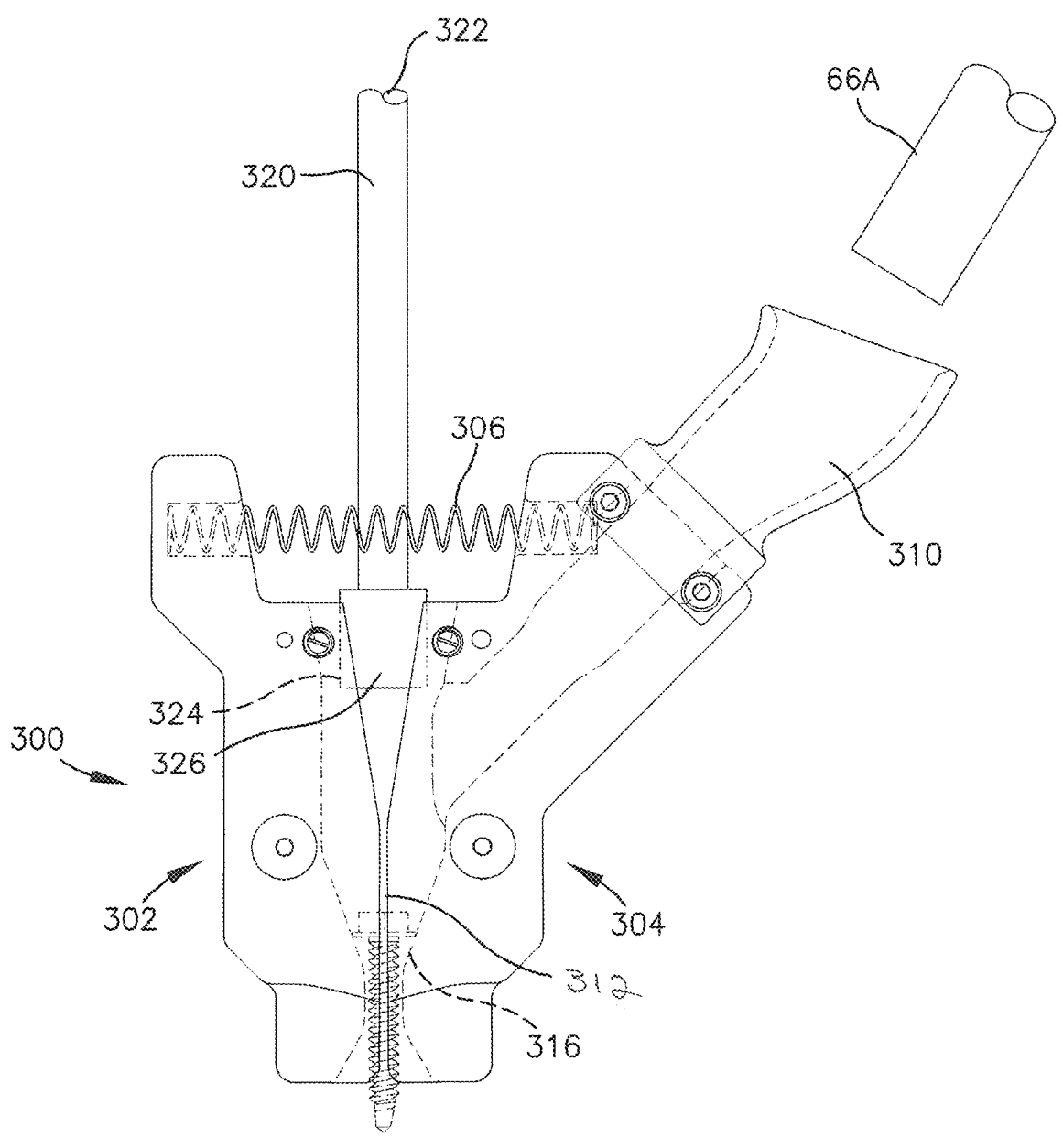
FIG. 12 illustrates a side elevation view of an embodiment of a fastener release mechanism with the jaws closed.

The fastener release mechanism 300, as illustrated at FIG. 10, is mounted to the fastener release mechanism mounting plate 258 using fasteners. As illustrated at FIG. 12, the fastener release mechanisms 300 hold the fasteners until a sidelap or a structural member fastening event is ready to occur. The fastener release mechanism 300 includes a pair of jaws 302, 304 that are biased with a spring 306. Fasteners move from the hoppers 58, 60 past the optical sensors 74A, 74B then into the distribution tubes 66A, 66B and into a side channel 310 in the fastener release mechanism 300.

Once in the side channel 310, the fastener drops into the vertically oriented main channel 312. The head of each fastener is captured at the base opening 316 of the pair of jaws 302, 304 because until the jaws are expanded by overcoming the bias 306, the head of the fastener cannot pass through the base opening 316. The threaded shank of each of the fasteners; however, extends through the base opening and is ready for insertion into the metal deck (sidelap) or into a structural member (e.g., purlin).

A magnetized nut driver 320 with a first end 322 and a second end 324 is used to drive the fastener into the sidelap or the identified structural member passing first through the metal decking. The first end 322 of the magnetized nut driver 320 is firmly secured into the chuck 210 of each of the drills 204. The second end 324 of the magnetic nut driver 320 incorporates a drive head 326 that fits over the head of the fasteners. When the linear actuators 212 of the drills 204 are energized by the system controller 43 and fastening controller 203, the actuators will plunge the magnetic nut driver 320 downward and simultaneously activate the rotation of the drills 204. The drive head 326 engages with the fastener propelling the self-driving fastener through the metal deck and structural member or into the sidelap.

The torque applied to the fastener through the magnetic nut driver 320 as previously detailed, is controlled by the fastening controller 203 which in turn controls the electronic clutch setting of the drills 204 and stops plunging of the drills when the specified torque setting is achieved. The clutch setting is adjusted autonomously for the specific needs of the fastener installation and are input by the operator.

The torque adjustment setting is critical to prevent over torque or under installation of the fastener. This torque setting is initially established prior to the installation process; however, the fastener installation depth is also preferably set by a feedback loop. This can be accomplished by collecting data on the force required by the linear actuator 212 to penetrate the overlapping metal deck sheets (sidelap) and the structural member successfully as can be obtained with the drill motor 204 along with the system controller 43.

Figure 13:
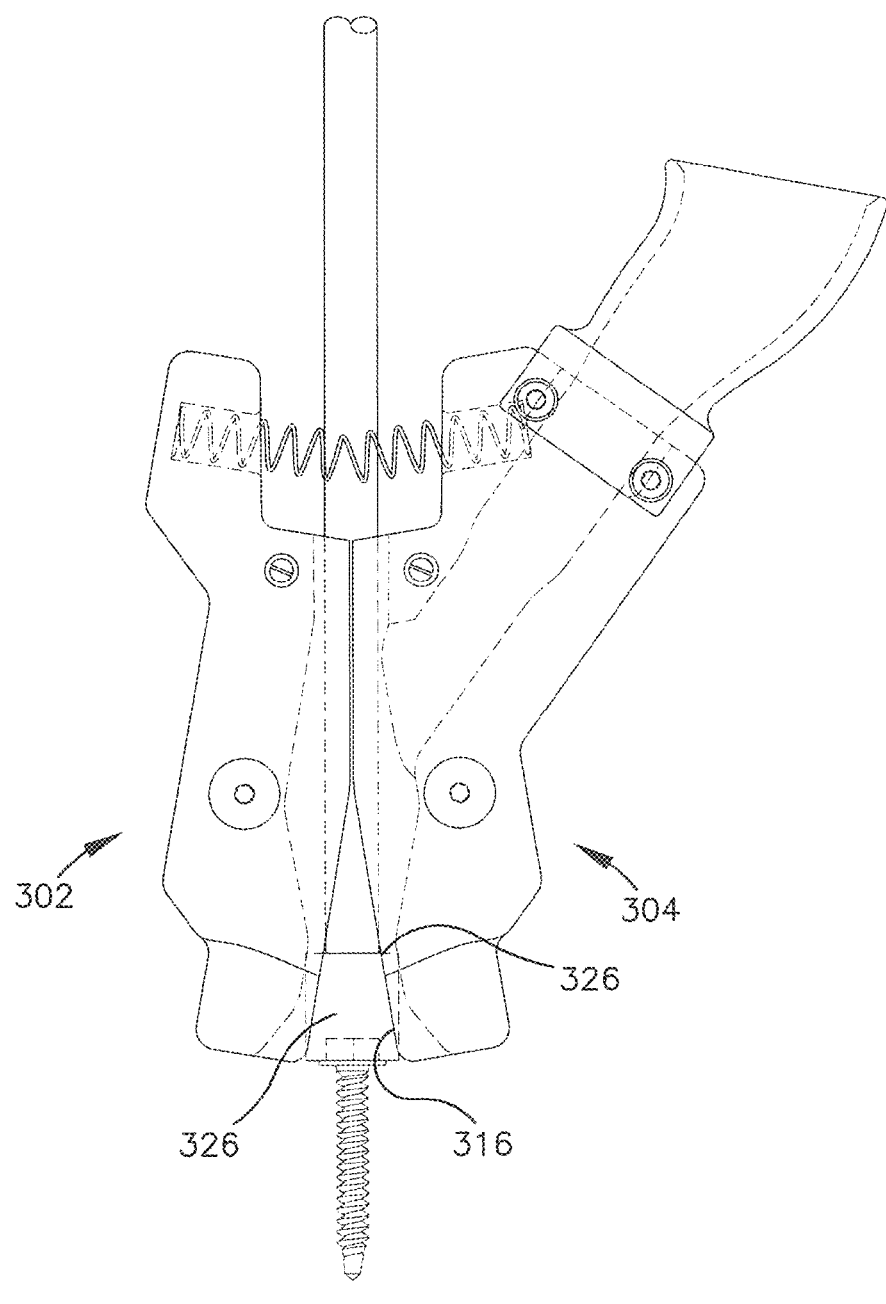
FIG. 13 illustrates a side elevation view of an embodiment of a fastener release mechanism with the jaws open.

The linear actuator 212, drill motor and an electronics package 205 and system controller 43 are capable of monitoring and recording this data. Not until the biased pair of jaws 302, 304 open as illustrated at FIG. 13, due to the downward plunging of the nut driver 320 and drive head 326 are the pair of jaws 302, 304 opened. Because of the canted surface 326A of the interior of the base opening 316 the plunging drive head 326 forces the jaws open as the fastener is rotated into the deck and underlying structural member. Once the torque required to advance the fastener into the structural member exceeds a pre-set threshold the linear actuator withdraws the drill 204 and nut driver 320.

Figure 14:
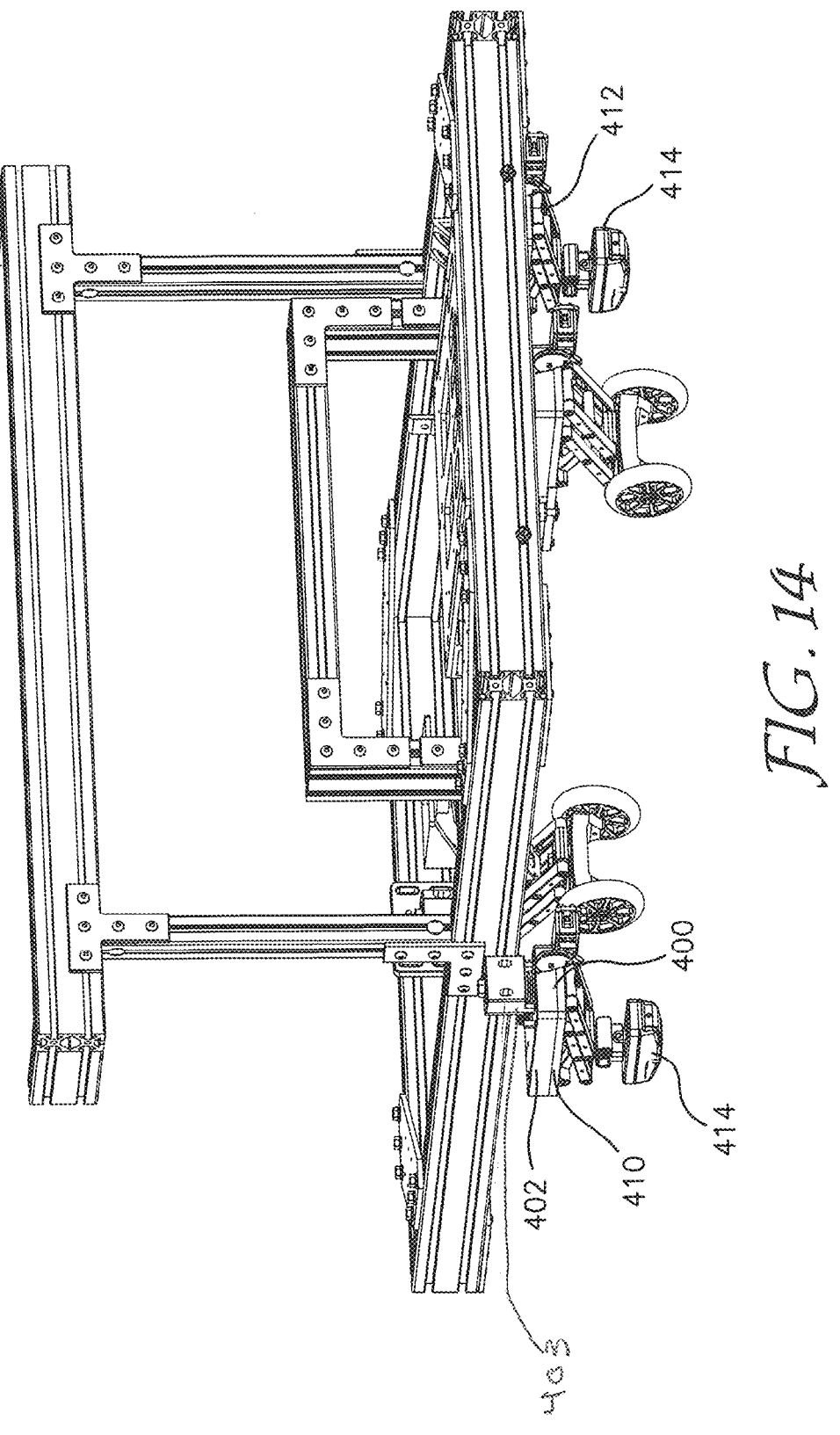
FIG. 14 illustrates a perspective view of an embodiment of a metal deck structural detector sensor assembly suspended from beneath a framework of the assembly.
Figure 15:
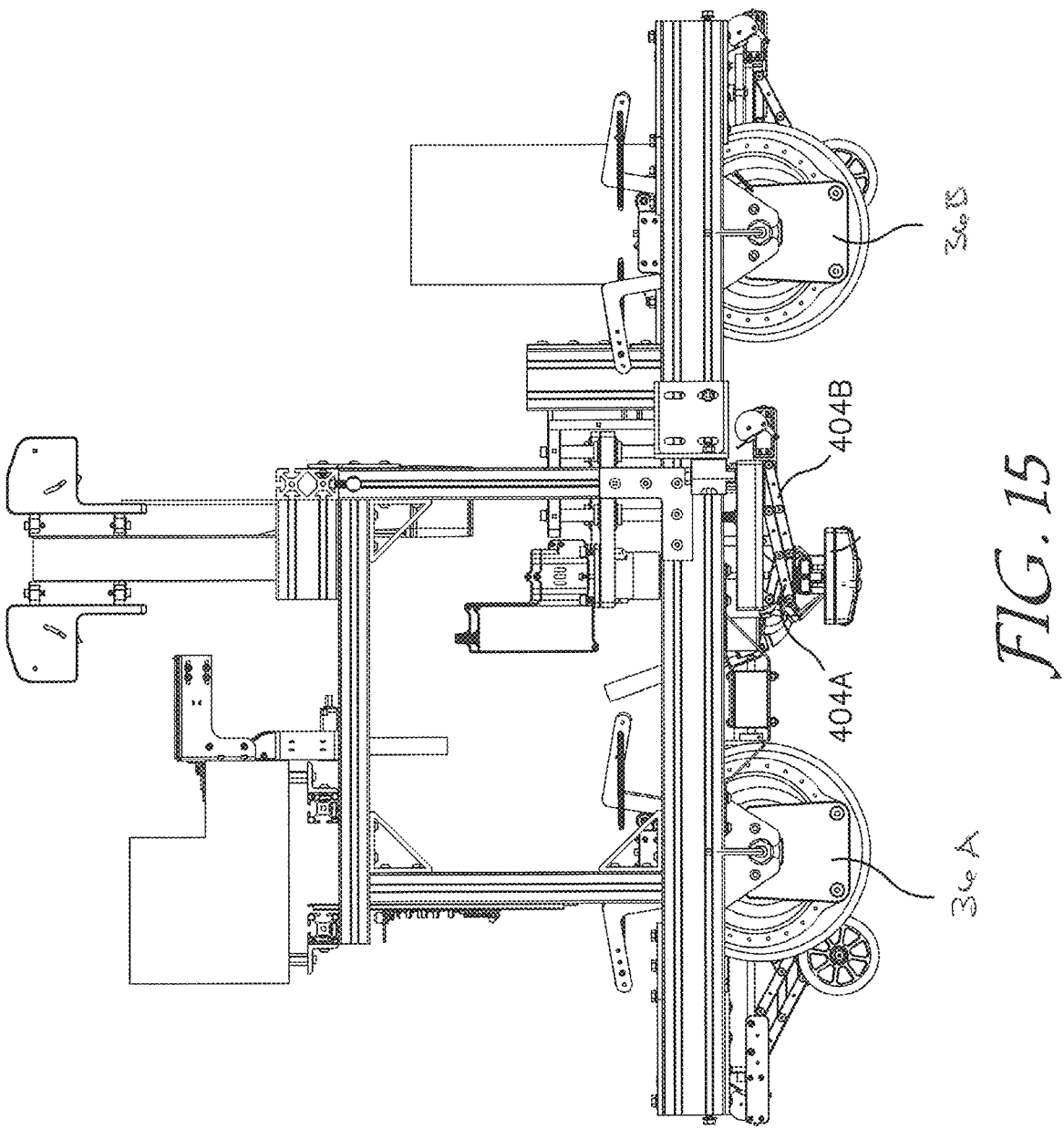
FIG. 15 illustrates a side elevation view of an embodiment of the autonomous system to include the metal deck structural detector sensor assembly in a raised configuration.

The disclosed system 10 also utilizes a metal deck structural member detection sensor system 400 deployed in the corrugations 14 of the metal deck 12 as illustrated at FIGS. 14, 15 and 16. The sensor assembly support plate 402 is held in position beneath the autonomous system 10 between the wheel motor assemblies 36A-D at each end of the system, as best illustrated at FIGS. 4 and 14. The support plate 402 is suspended from and anchored to the platform 30 by a mounting bracket 403 at each sensor assembly. Indirectly mounted to the underside of the sensor assembly support plate 402 at the longitudinally opposed sides 410, 412 are the structural member detection sensors 414. Alternative placement of the detection sensors 414 including at the two ends instead of the sides 410, 412 are also contemplated by this disclosure. The detection sensors 414 can detect the location of a purlin or bar joist reliably and can work with different metal deck thicknesses. Additionally, the detection sensors 414 can work with a very narrow air gap above the metal decking.

Once the system 10 is maneuvered into position for a fastening session, the sensor assembly 400 is lowered into position by a sensor assembly linear actuator 404A (FIG. 15) interconnected with linkages 404B (FIG. 15) that facilitate, as needed, a vertical descent and ascent of the sensor assembly 400. A multitude of linkage configurations, such as a four-bar linkage, to raise and lower the sensor assembly 400 are contemplated by this disclosure and are well understood in the industry. The linkages are pivotally attached at connection points that extend downwardly from a platform 416 as illustrated at FIG. 17.

When the system 10 is moving between the corrugation rows 14 of the metal decking 12, the metal deck structural member detection sensor system 400 is automatically raised to prevent unwanted interference between the corrugations 14 and the sensor assembly 400. An exemplary linear actuator 404A for connection to the linkages 404B for use in controlling the elevation of the sensor assembly 400 for this application is part No. MD12A025-0150XXX2NNSD sold by Thompson® Industries, the same component utilized for the fastening linear actuator 212.

FIG. 17 illustrates an embodiment of a structural member detector 414 contemplated by this disclosure. Chamfered edges 415 on the protective casing 415A of the truss purlin detector aid the detector 414 in traversing over the imperfections in the metal deck and the bottom surface of the sensors' protective casing 415A has a removable interface that is resistant to abrasion and heat in the event the casing contacts the decking. As illustrated at FIG. 17A, the metal deck structural member detection sensors 414 are a sensor system for detecting a structural object beneath a surface layer and preferably include a U-shaped magnetic core M having a first leg L1, a second leg L2, and a core yoke Y connecting the first and second legs L1, L2. The metal deck structural member detection sensor embodiment illustrated at FIG. 17A is not drawn to scale as it is contemplated that the sensor would fit within a corrugation of the metal deck.

The detectors also utilize a primary winding W1 wrapped around the first leg L1 of the magnetic core M. A secondary winding W2 is wrapped around the second leg L2 of the magnetic core M. The secondary winding W2 is short-circuited and an alternating current power source AC connected to a sine wave oscillator circuit OC and then to the primary winding W1 to generate an excitation waveform. The metal deck structural member detection sensors 414 also utilize a processor configured to analyze a change in magnetic response of the sensor system 414 as the sensor is translated along the surface layer of the metal deck 12 to detect the presence of the structural objects beneath the corrugations 14.

A zero-crossing detector Z is an electronic circuit, used to detect when a voltage and/or current signal crosses zero volts (i.e., the point where the signal changes polarity from positive to negative or vice versa). These detector circuits Z are used to determine the precise moment when a signal transitions through zero voltage and current by viewing a monitor S. The zero-crossing detector is typically wired in parallel to the primary winding W1 of the sensor (for voltage) and/or in series (for current).

When the input signal transitions from positive to negative, the zero-crossing detector Z may output either a low pulse or a high pulse depending upon the circuit design. In the disclosed system 10 where there exists a need to measure the phase difference between the voltage and current, zero-crossing detection is useful to detect the exact moments when each waveform crosses zero (as seen on monitor/scope S) and thereby identifying the location of the structural member SM lying beneath the metal deck. The phase shift can then be calculated, preferably with a processor or a microcontroller, based on the time difference between the two zero-crossing events.

As illustrated at FIG. 18, extending downward from the sensor assembly support plate 402 are fastener detectors 420. The autonomous system 10 as disclosed herein preferably includes six (6) spaced apart detectors 420, each detector is positioned beneath a fastener release mechanism 300 of a drill assembly 201 with a fastener being passed through the opening 424A at the bottom 424 of the swing 422 of the fastener detector 420. The existing fastener detectors 420, as illustrated at FIG. 18 are pivotally mounted mechanical swings 422 that maintain a downward neutral position proximate the bottom of the corrugations 14 due to the greater mass of the swing being below the center of rotation.

As illustrated at FIGS. 19A-19D if a preinstalled fastener head or obstacle, such as debris, is contacted by the lower end 424 of the swing 422, the beam passing between the forks 425A, 425B of a photo interrupter sensor 426 is broken by a disc 428 that is connected to and rotates with the swing 422. The beam of the photo interrupter normally passes through a cutout 429 (FIGS. 19A, 19B and 19C) in the disc 428. As the swing 422 rotates due to contact with an object, the disc 428 also rotates and obstructs the path of the beam, passing between the forks 425A, 425B, since the light beam can no longer pass through the cutout 429.

To protect the drills 204 and the integrity of the deck 12 should the beam passing between the forks 425A, 425B be broken, meaning an obstruction is encountered, the drill assembly 201 will not actuate if the beam of the sensor 426 has been interrupted. Each of the drills 204 is positioned directly above one of the detectors 420 of existing fastener such that the nut driver 320 pushes down on the fastener causing the fastener to pass through the opening 424A at the bottom 424 of the swing 422 prior to engagement with the deck. As noted above, if the swing 422 is not in the full downward position thereby causing the disc 428 to obstruct the path of the beam from passing through the cutout 429 then the drill assembly 201 will not activate and the fastener is not driven into the deck 12 and the underlying structural support member.

The spacing for installation of sidelap fasteners is determined by the turning of the tires 42 of the autonomous system 10 after it departs a structural fastening stop. The autonomous system 10 records the distance the system travels after leaving a stop where the system 10 has installed a fastener in a structural member and inserts sidelap fasteners at the prescribed interval programmed through use of the controller. As illustrated at FIG. 21, the sidelap fasteners F are installed through nested sidelaps 17A, 17B, that overlap at the pan (trough) between the webs 19A, 19B of adjacent high flutes 21A, 21B.

The sidelap fastening begins anew once the autonomous system 10 crosses the next structural member and inserts a fastener into the structural member. Each of the wheeled motor assemblies 36A-36D includes a 4096 encoder in each hub motor that the position controller uses to control velocity commands, monitor overall distance travelled and get a relatively precise location for the next sidelap fastener. A 4096 encoder has 4096 pulses/positions per revolution and may optionally be an incremental or absolute encoder.

As illustrated at FIG. 20, also utilized by the disclosed system 10 are corrugation guide sensor assemblies 500. The corrugation guide sensor assemblies 500 are mounted to corrugation guide sensor support plates 502 and are preferably positioned in front of and behind the collection of existing fastener detectors 420 that are mounted to the sensor assembly support plates 402. As illustrated at FIG. 20, corrugation guide sensor support plates 502 are positioned at the first end 504 and the second end 506 with a guide sensor assembly 500 located at both the first and the second ends.

As illustrated at FIGS. 20 and 21, each of the guide sensor assemblies 500 located on the first and second ends 504, 506 (and in a preferred embodiment on both sides of the assembly 10) includes a guide wheel 508. When contact occurs between the side of the corrugation 14 and the guide wheels 508 an analog rotary encoder 512 detects the rotation of the guide wheel 508 attached to a guide shaft 510. The guide shaft 510 is biased to maintain a preferred position within the corrugation 14. The disclosed system 10 is capable of driving from one fastener installation point to the next along the deck while maintaining a straight path along the deck corrugations. To accomplish this the guide sensor assemblies 500 keep the drive system positioned laterally with orientation inputs. The structural member detection sensors 414 are used to determine when to stop over a structural member.

Rotation of the guide shaft 510 provides the wheel motor assemblies 36A-D with the sensor data needed to maneuver the system 10 effectively performing slight course corrections as the system advances across the metal deck 12. Deviations from the desired position are corrected by applying adjustments to the speed control function of the wheel motor assemblies 36A-D thereby correcting the path of the autonomous system 10.

As illustrated at FIGS. 22 and 24, the autonomous system 10 disclosed herein also utilizes a plurality of edge detection sensors 600 to sense when the decking ends and to avoid running off the edge of the metal deck. Since the disclosed system 10 is intended to be used on large, unprotected decking, it must have the capability to prevent itself from traveling over an edge or encountering an obstruction upon the deck that may impede operation of the system 10.

The edge detection sensors 600 are preferably located at both upper edges 45 of the enclosure 44, as illustrated at FIG. 4, with the enclosure providing protection against inadvertent contact by an operator or impact with another object. The edge detection sensors 600 are capable of monitoring obstructions and deck edges in either direction of travel due to the edge detection sensors being located at both edges 45. A laser rangefinder is preferably used to detect a change in elevation. An exemplary rangefinder to provide this capability is produced by Sick™ AG under part No. 1136647. A preferred embodiment of the sensor can accurately measure distances of 150 mm to 2 meters and can operate on 10 to 30 volts DC drawing no more than 25 mA.

The positioning subsystem 608, as illustrated at FIG. 24, includes the controller 610 that is responsible for monitoring the structural member detection sensors 414, corrugation guide sensors 500, and metal deck sheet edge detection sensors 600 as well as sending commands to control the linear actuators 212 and wheel motor controllers 36A-D. An exemplary positioning controller is sold by Adafruit under part No. 4759, the same controller used in the fastening subsystem.

FIG. 23 illustrates an operational process flow diagram for the autonomous system 10. The autonomous system 10 is started by the operator selecting the power on option 702. Next, the system 10 itself performs a pre-operation self-test 704 and if the software determines that the system 10 is not functioning properly a status light 706 is illuminated and then the system will automatically power down 712 ending operation 714 of the unit. If the self-test 704 software self-check passes, then the operator begins manually inputting the session settings 708 with the aid of the user interface 50. Once the session settings are entered by the operator, the operator commences manual piloting 710 of the autonomous system 10.

The operator, again using the user interface 50, confirms the start position 716 upon the metal deck 12, then selects the fastening travel direction 718 along with the fastener installation pattern, sidelap space interval and fills both the structural and sidelap fastener hoppers 58, 60 with roughly five hundred fasteners. Once the loading is completed the operator confirms that the fastener sorting and distribution are initiated until the drill assembly 201 is loaded with fasteners. The operator then confirms the fastening travel direction 720 of the autonomous system 10.

Once the above referenced operator actions are complete, the autonomous system 10 is released to travel in the specified direction 732 as detailed at FIG. 23. Using the structural member detection sensor 414, the system 10 determines if a structural member is detected 722. If a structural member is detected, as detailed at FIG. 23, then the system 10 ceases travel 724 and the fasteners are sunk into the structural member in the pattern previously specified by the operator using the user interface 50.

As detailed at FIG. 23, the drill motor linear actuators 212 plunge the spinning drills 204 according to the selected fastener installation pattern securing the roof deck 12 to the structural member 726. The autonomous system 10 then assesses whether the specified number of structural members have been encountered 728. If the number of structural members encountered is consistent with the value programmed by the operator, then a status light is illuminated 730 notifying the operator of the completion of the programmed tasking.

As detailed at FIG. 23, if the sensors 414 of the autonomous system 10 do not detect a purlin top chord 722 then the sensors 414 in combination with the electronics package within the four-wheel motor assemblies 36A-D are utilized to determine if the spacing required for a sidelap fastener has been reached 734. If the sidelap spacing has been reached, then the autonomous system 10 ceases travel 736 and sinks a sidelap fastener 738. The disclosed system 10, as detailed at FIG. 23, also continuously assesses, using edge detection sensors 600, whether the system is at the edge of the metal deck sheet, or a fault is detected 740.

The system 10 further includes the capacity for recording, for each installed fastener, data including location, fastener type, commanded torque or speed setting, a motor-current and/or actuator-force profile, and a pass/fail determination, and generating an audit record of pattern completions so that in the event the installation processes require auditing for conformance with design plans.

If the sensors 600 detect the edge of a metal deck sheet, then the autonomous system ceases travel 742 and indicates the status of the system 744 by illuminating lights on the light bar 46 and/or lights on the mast 48 (FIG. 4). Once the lights on the light bar 46 and/or lights on the mast 48 are illuminated, intervention by the operator 746 is required. Intervention by the operator 746 requires the operator to assess whether the autonomous system 10 should start along another path on the roof deck 12 to continue the installation of the fasteners. FIG. 23 details the manual piloting by the operator of the autonomous system to the next metal deck 12 pathway for installation of the deck 748.

FIG. 24 illustrates an exemplary hardware high level design of the disclosed system 10. The hardware architecture is separated into three separate blocks to include (i) the user interface 50, (ii) the fastening subsystem 200, and (iii) the positioning subsystems 608. The architecture is intended to be modular and distributed such that the subsystems can be developed and tested independently, then easily integrated by use of a central controller area network (CAN) bus using CANopen protocol specification.

FIG. 25 illustrates a preferred embodiment of the power supply architecture of the autonomous system 10. It is estimated from the completion of a power budget exercise that the autonomous system requires about 300 Wh of energy. To operate for a specified four-hour run time, it would take about 1200 Wh of energy. For a battery with a voltage of nominally 48 volts, a battery with a capacity of at least 25 amp-hours is required. An exemplary battery for this application is available from Varta® under part No. 56654 799 092.

A variety of power regulators are also required for the autonomous system 10 to function properly. To power the gantry stepper motor 73, metal deck edge detectors 600 and the external lighting 54 a 24-volt rail is required. To power the drill motors 204 a 20-volt rail is required. The structural member detector driver circuit 414, existing fastener sensors 420, linear actuators 212, fastener sorters 62, 64 and the remote-control transceiver 55 all require a 12-volt power supply. Lastly, the autonomous system 10 requires a five-volt rail to power the system controller 43, fastening controller 203, positioning controller 610, corrugation guide sensors 500, and fastener distribution sensors 74A-B, 76A-B, 78. Exemplary power regulators that satisfy the power requirements are available from ATO™ located in Diamond Bar, California.

To protect the autonomous system from inadvertently rolling off a metal deck a braking system 900 is preferably utilized as illustrated at FIGS. 26 and 27. The braking system 900 utilizes two brake arms 902, 904 that are each hinged at respective lower ends 906, 908 to the wheel support frame 910. Each brake arm 902, 904 carries a wear lining 912, 914 positioned to frictionally engage a hub 916 of each of the wheels 36A-D. A tension spring 920 interconnects upper ends 924, 926 of the brake arms 902, 904 to bias the brake arms toward one another.

The braking system 900 further includes an electrically driven cam 930 disposed between the brake arms 902, 904 and configured, when energized, to rotate and urge the brake arms apart against the bias of the tension spring 920. The cam 930 utilizes rollers 932, 934 at each of opposite axial ends 936, 938 for rolling contact with the brake arms 902, 904. Upon loss of electrical power to the cam 930, the tension spring 920 rotates the cam 930 to a position permitting the brake arms 902, 904 to move together so that the wear linings 912, 914 grip the wheel hub 916 and stop rotation of the wheel.

The disclosed system 10, also utilizes a non-transitory computer-readable medium storing instructions that, when executed by one or more controllers of the autonomous metal deck fastening system, cause the controllers to perform a pre-operation self-test and accept session settings including a fastening pattern, travel direction and sidelap fastener spacing.

The controllers also home a fastener distribution gantry and enable screw sorters to stage oriented fasteners and lower a sensor assembly into a corrugation while maintaining a carriage heading from corrugation guide sensor feedback. The controllers support navigation along the corrugation, stop over a detected structural member, and actuate selected fastening units so that a linear actuator plunges a drill while a pulse-width-modulated signal sets drill speed to drive a fastener released from a spring-biased jaw mechanism. The controllers advance the system between structural-fastener locations and sidelap-fastener intervals according to the stored pattern and enforce interlocks that inhibit motion or actuation upon detection of a metal deck edge or an obstacle.

The instructions of the non-transitory computer-readable medium further cause the controllers to communicate with wheel motor drivers, linear actuators, screw sorters, and sensors over a controller area network using a CANopen protocol. Additionally, the instructions of the non-transitory computer-readable medium further cause the controllers to determine a fastener-seating event by comparing drill motor current and/or linear-actuator force to a threshold profile and to retract the linear actuator when the seating event is detected.

The instructions of the non-transitory computer-readable medium also cause the controllers to command the gantry to align a distribution outlet with a selected fastening unit, confirm fastener presence with an optical interrupter at the fastening unit inlet, and only then authorize a plunge sequence that mechanically opens the spring-biased jaw release by engagement of the nut driver.

An alternative embodiment of the system 10 disclosed herein automatically applies two distinct fastening processes depending on location. These fastening processes include high-energy pin driving (pneumatic or powder-actuated) at roof structural-member locations, and conventional screw driving by drill at sidelaps between adjacent deck sheets. This division preserves the speed and penetration performance required at structural supports while retaining the proven sidelap screw joint that installers and codes expect.

As previously detailed above, the controllers 43, 75, 203, 610 (FIG. 24) implement navigation, detection, sequencing, energy management, and interlocks so that only structural-member fasteners are installed by pneumatic discharge or powder-actuated shot, and sidelap fasteners are installed by a drill. The carriage, as previously detailed, includes driven wheels with encoders and a low-profile chassis that straddles a deck corrugation. A vertically translatable sensor sled enters a corrugation to provide guidance. The chassis provides rigid mounting for the fastener distribution gantry and for two classes of fastening units: structural pin-driving units and sidelap screw-driving units.

In this disclosed embodiment two hoppers are provided, a first hopper stores structural pins and a second hopper stores sidelap screws. Pins may be oriented point-down by vibratory or escapement mechanisms or fed as collated strips; screws may be oriented head-up using the screw sorter previously discussed. A linearly translatable gantry sled positions one or more outlets above selected fastening units to load the next fastener type on demand. Optical interrupters or similar presence sensors confirm delivery before a firing/driving sequence is authorized.

Example of vendors capable of supplying the requisite hardware for orientation/sorting and delivery include: SPI-ROL and Visumatic for pin/screw feeding and BeA (Auto-Tec) and Everwin for machine-mount nailer-style feed throats that can be adapted to receive pins. Each structural-fastening unit carries a contact-trip nose and a pin-driving head designed to deliver a short, high-energy impulse to the pin.

In the pneumatic variant, an accumulator near the head stores compressed air at a regulated setpoint. The head converts a short, high-energy pulse into penetration through deck and into the member, only after a contact-trip is engaged and the head aligns, safeguards, and delivers the energy to install the fastener with the required precision and repeatability. A fast-acting, high-flow "firing valve" (such as a poppet-type 3/2 or 4-way valve) is mounted as close as practical to the drive chamber. The firing valve is a fast-acting, high-flow pneumatic valve placed very close to the tool's drive chamber.

When it opens, it dumps the accumulator's compressed air into the chamber in a single, sharp pulse, creating the impact that drives a pin. Then the chamber is vented (often via a quick exhaust) so pressure collapses immediately. The drive chamber is the sealed cavity in the pin-driving head that fills with high-pressure gas to accelerate a piston/ram, which in turn strikes and drives the pin. It is where stored energy (air in a pneumatic system, propellant gas in a powder-actuated system) is converted into the piston's kinetic energy for the hit.

Vendors for the pneumatic hardware and firing valves include: Parker Hannifin and SMC for filters/regulators/filter-regulators (FRL) and pressure regulation; Emerson (ASCO/AVENTICS) poppet solenoid valves (e.g., Series 344/8344 and AVENTICS 227) suitable as firing valves; MAC Valves (e.g., Bullet Valve® family) and for high-flow poppet valves; ROSS Controls, Clippard, and Norgren for quick-exhaust valves sized to the drive chamber volume. A typical pneumatic assembly includes a main supply, filters and regulators, an accumulator, firing valve at the head, drive chamber, with a quick exhaust ported at the chamber. Coil voltage, response time, and duty cycle are selected to match pulse energy, cycle rate, and thermal limits. Coil voltage is important because it determines how reliably and repeatably the solenoid-actuated valves (the firing valve, inlet/isolation valves, purge/quick-exhaust pilots, regulator pilots, etc.) switch-directly affecting drive-pulse timing, safety interlocks, and overall power design.

In the powder-actuated variant, the unit incorporates a powder-actuated driving mechanism with selectable charge/power levels. The controller maps the required penetration (deck gauge and structural-member properties) to a load color or numeric power setting and verifies contact-trip engagement before enabling the shot.

Sidelap fastening units each include an electrically driven drill motor, a pulse-width-modulated speed controller, a linear actuator to plunge the spindle, a nut-driver bit held in a chuck, and a spring-biased jaw that retains a screw by its head until engagement by the nut driver during the plunge. Torque, speed, plunge force, and dwell are coordinated to achieve repeatable screw seating through overlapping sheets without structural-member detection. Suitable motors, gearheads, and drives are widely available.

In both variants, each pin-driving head is mounted on a guided slide driven by a linear actuator (e.g., electric screw, belt, or pneumatic cylinder). During a structural-member event, the controller commands a controlled descent, so the nosepiece contacts the decking and compresses the contact-trip to a verified stroke. Only when a closed-contact signal is received (and pin presence is confirmed) does the system enable the firing sequence.

The actuator then holds position to maintain nose preload and joint stability throughout the impulse, after which it retracts to a safe standoff to accept the next pin. Stroke, velocity, and downforce are closed loop limited using position and force/torque feedback to prevent surface damage or premature discharge. The same plunge routine applies to the powder-actuated implementation, where contact-trip closure controls the trigger/enable circuit for the selected charge level, and to the pneumatic implementation, where contact-trip closure permits the firing valve to dump the local accumulator into the drive chamber.

One or more electronic controllers communicate with wheel drives, linear actuators, sorters/feeders, sensors, regulators, firing valves, and powder-actuated interfaces over an internal bus (e.g., CAN using CANopen). The controllers execute a stored fastening pattern that alternates between structural-member events and sidelap intervals along the corrugation. At a structural-member event the controller: (i) halts motion; (ii) verifies pin presence at the structural unit inlet; (iii) plunges the pin-driving head to close the contact-trip; and (iv-a) for pneumatic units, commands the firing valve to discharge the accumulator, or (iv-b) for powder-actuated units, enables and triggers a shot at the selected charge level. At a sidelap interval the controller: (i) aligns the sidelap unit; (ii) verifies screw presence; (iii) plunges the drill; and (iv) applies a PWM profile to drive and seat the screw.

For structural pins, an energy profile maps deck/member combinations to either pneumatic pressure (and accumulator size) or powder-charge level. Seating can be inferred from any combination of: (i) pressure-transient signatures at the drive chamber (pneumatic), (ii) recoil/force signatures from the linear actuator, and (iii) pin depth or standoff sensing at the nose. For sidelap screws, seating is detected by monitoring motor current/torque and/or linear-actuator force against thresholds. The controller retracts the actuator upon detecting a seating signature and logs cycle data to refine the profile.

Multiple interlocks prevent unintended firing/driving, including missing-fastener detection, contact-trip not engaged, deck-edge proximity, obstacle detection, and controller state checks. Powder-actuated integration additionally requires guarding, spent-cartridge collection or ejection management, and adherence to vendor training and regulatory requirements. The system architecture accommodates both hardware interlocks (series-wired safety relays) and software interlocks (state machine gating of enable lines). Vendors such as Hilti, Ramset, and Simpson Strong-Tie provide OEM guidance for safe fixturing and enable/trigger interfacing; pneumatic safety components (dump valves, lock-out) are available from ROSS Controls, SMC, and Parker.

While the examples above show separate, dedicated structural and sidelap units, a single carriage can carry multiple heads of each type to match required throughput. Pin feed may be loose, or strip collated. The pneumatic accumulator volume can be integrated within the head or packaged as a manifold serving several heads. Firing valve placement may be on the head, or manifolded, provided line losses preserve the target pressure rise time. Powder-actuated units can be gas-actuated, or hybrid provided they support discrete, controllable energy settings. Communication may employ other industrial protocols. These and other modifications remain within the scope defined by the claims.

Vendors of pneumatic hardware include Parker Hannifin and SMC while vendors of fast "firing" valves (poppet/solenoid) include Emerson (ASCO/AVENTICS); MAC Valve and Humphrey Products. Quick-exhaust valves are available from ROSS Controls; Clippard and Norgren while vendors of powder-actuated heads and other hardware include Hilti; Ramset (ITW); Simpson Strong-Tie and DEWALT. Machine-mount heads/feeds (pneumatic impact or pin insertion) are available from BeA (AutoTec); Everwin; SPIROL and Visumatic. All vendor names and product families are provided as illustrative examples only. Equivalent components from other suppliers may be substituted without departing from the scope of the invention.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art.

For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

Any reference to components or products from a specific vendor or supplier within this application is made for illustrative purposes only and should not be construed as limiting the scope of the invention. The invention contemplates the use of equivalent components or products from other vendors that perform substantially the same function in substantially the same manner to achieve substantially the same result. The use of vendor-specific components or products is not intended to exclude other suitable alternatives or equivalents from other vendors, and such alternatives are within the scope of the present invention.

The disclosure presented herein is believed to encompass at least one distinct invention with independent utility. While at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A system for autonomously attaching corrugated metal decking to structural members, comprising:
  a motorized wheeled carriage configured to traverse the decking;
  a fastener management subsystem including first and second hoppers for structural and sidelap fasteners, respective screw sorters that orient fasteners head-up, and a distribution assembly having a linearly translatable gantry with a sled configured to selectively route oriented fasteners through flexible conduits to any one of a plurality of fastening units;
  the plurality of fastening units each comprising an electric drill, a pulse-width-modulated speed controller coupled to the drill, a linear actuator coupled to translate the drill toward the decking, a nut driver received in a chuck of the drill, and a spring-biased jaw release positioned to retain a fastener by its head until engagement by the nut driver during a plunge stroke;
  a sensor assembly arranged to enter a corrugation of the decking and including (i) roof structure detectors responsive to proximity of a roof structural member, (ii) corrugation guide sensors each having at least one guide wheel on a biased shaft with a rotary encoder to indicate lateral deviation, and (iii) detectors for existing fasteners each comprising a spring-loaded mechanical swing linked to a photo-interrupter;
  metal deck sheet-edge range sensors mounted to the carriage; and
  one or more electronic controllers operatively coupled to wheel motor drivers, the fastener management subsystem and the fastening units via a communication bus, the controllers being configured to: (A) navigate the carriage along a selected corrugation using feedback from the corrugation guide sensors; (B) stop the carriage in response to the structural member detectors; and (C) actuate selected fastening units according to a stored pattern to drive fasteners with controlled torque into the decking and the structural members.

2. The system of claim 1, wherein the fastener management subsystem further comprises optical presence sensors located at (i) exits of the screw sorters, (ii) the gantry sled, and (iii) an inlet of each spring-biased jaw release, each optical presence sensor being a fork-type interrupter configured to detect a passing fastener and to signal a jam condition.

3. The system of claim 1, further comprising a fail-safe braking assembly including opposed brake arms biased together by a spring to frictionally engage a hub of a wheel of the carriage upon loss of electrical power, and an electrically driven cam configured to separate the brake arms during powered operation.

4. The system of claim 1, wherein the controllers are further configured to determine proper seating and thread engagement by monitoring at least one of drill motor current and linear-actuator force to detect a threshold indicative of seating, and to retract the linear actuator when the threshold is exceeded.

5. The system of claim 1, wherein the controllers inhibit any plunge or rotation unless optical presence sensors confirm fastener presence at (i) exits of the screw sorters, (ii) the gantry sled, and (iii) an inlet of each spring-biased jaw release.

6. The system of claim 1, wherein each detector for existing fasteners comprises a spring-loaded mechanical swing linked to a photo-interrupter and the controllers inhibit actuation when the swing deflects and interrupts the photo-interrupter beam.

7. The system of claim 1, wherein the metal deck sheet-edge sensors comprise a laser rangefinder configured to detect elevation change within a range of about 150 mm to 2 m and to operate on 10-30 VDC.

8. The system of claim 1, wherein upon loss of electrical power the tension spring rotates the cam to permit the brake arms to engage the hub and stop wheel rotation.

9. The system of claim 1, wherein the controllers determine proper seating by monitoring drill-motor current and/ or linear-actuator force against a threshold profile and retract the actuator when the threshold is exceeded.

10. The system of claim 1, wherein the controllers log for each drive cycle at least location, torque/current or force signature, and pass/fail of seating for later analysis.

11. The system of claim 1, wherein the controllers communicate with wheel motor drivers, linear actuators, screw sorters, and sensors over a controller-area network using CANopen.

12. The system of claim 1, further comprising wheel hub encoders providing at least 4096 counts per revolution used by the controllers to determine sidelap screw spacing between structural-member events.

13. The system of claim 1, wherein the controller determines a structural-member location by computing phase shift between voltage and current zero-crossings of an excitation waveform applied to the primary winding.

14. The system of claim 1, wherein the controllers command the gantry to align a distribution outlet with a selected fastening unit, confirm fastener presence with an optical interrupter at the unit inlet, and only then authorize a plunge sequence that mechanically opens the spring-biased jaw release by engagement of the nut driver.

15. A non-transitory computer-readable medium storing instructions that, when executed by one or more controllers of an autonomous metal deck fastening system, cause the controllers to:

perform a pre-operation self-test and accept session settings including a fastening pattern, travel direction and sidelap fastener spacing;

home a fastener distribution gantry and enable screw sorters to stage oriented fasteners;

lower a sensor assembly into a corrugation of a corrugated metal decking while maintaining a carriage heading from corrugation guide sensor feedback;

navigate along the corrugation, stop over a detected purlin top chord, and actuate selected fastening units so that a linear actuator plunges a drill while a pulse-width-modulated signal sets drill speed to drive a fastener released from a spring-biased jaw mechanism;

advance between structural-fastener locations and sidelap-fastener intervals according to the stored pattern; and enforce interlocks that inhibit motion or actuation upon detection of a metal deck edge or an obstacle.

16. The non-transitory computer-readable medium of claim 15, wherein the instructions further cause the controllers to communicate with wheel motor drivers, linear actuators, screw sorters, and sensors over a controller area network using a CANopen protocol.

17. The non-transitory computer-readable medium of claim 15, wherein the instructions further cause the controllers to determine a fastener-seating event by comparing drill motor current and/or linear-actuator force to a threshold profile and to retract the linear actuator when the seating event is detected.

18. The non-transitory computer-readable medium of claim 15, wherein the instructions further cause the controllers to command the gantry to align a distribution outlet with a selected fastening unit, confirm fastener presence with an optical interrupter at the fastening unit inlet, and only then authorize a plunge sequence that mechanically opens the spring-biased jaw release by engagement of the nut driver.

19. The non-transitory computer-readable medium of claim 15, wherein the instructions cause the controllers to communicate with wheel motor drivers, linear actuators, screw sorters, and sensors over a controller-area network using CANopen.

20. The non-transitory computer-readable medium of claim 15, wherein the instructions cause the controllers to determine a seating event by comparing drill-motor current and/or linear-actuator force to a threshold profile and to retract the actuator when the seating event is detected.

21. The non-transitory computer-readable medium of claim 15, wherein the instructions cause the controllers to command gantry alignment, confirm fastener presence with an optical interrupter at the fastening-unit inlet, and only then authorize a plunge sequence that mechanically opens the spring-biased jaw release by engagement of the nut driver.

22. A system for autonomously attaching corrugated metal decking to structural members and fastening sidelaps, comprising:

a motorized wheeled carriage configured to traverse the decking;

a fastener management subsystem including a first hopper for structural pins and a second hopper for sidelap screws, that present pins point-down, screw sorters that present screws head-up, and a distribution assembly having a linearly translatable gantry with a sled configured to selectively deliver pins or screws to selected fastening units;

a plurality of structural fastening units, each comprising a pin-driving head powered by one of (i) a pneumatic circuit including a regulated pressure source and a firing valve or (ii) a powder-actuated mechanism, a linear actuator coupled to translate the pin-driving head toward the decking, and a magazine or feed throat receiving pins from the distribution assembly;

a plurality of sidelap fastening units, each comprising an electric drill, a pulse-width-modulated speed controller coupled to the drill, a linear actuator coupled to translate the drill toward the decking, a nut driver received in a chuck of the drill, and a spring-biased jaw release positioned to retain a screw by its head until engagement by the nut driver during a plunge stroke;

a sensor assembly arranged to enter a corrugation of the decking and including (i) roof structure detectors responsive to proximity of a roof structural member, (ii) corrugation guide sensors each having at least one guide wheel on a biased shaft with a rotary encoder to indicate lateral deviation, and (iii) detectors for existing fasteners each comprising a spring-loaded mechanical swing linked to a photo-interrupter;

one or more electronic controllers operatively coupled to wheel motor drivers, the fastener management subsystem, and the fastening units via a communication bus, the controllers being configured to: (A) navigate the carriage along a selected corrugation using feedback from the corrugation guide sensors; (B) stop the carriage in response to the structural member detectors; and (C) actuate fastening units according to a stored pattern such that, at structural-member locations, a selected structural fastening unit is plunged, and a pneumatic discharge or powder-actuated shot commanded to drive a metal pin through the decking into the structural member, while at sidelap locations, a selected sidelap fastening unit is plunged and a drill rotates the nut driver to drive a screw through overlapping sheets-whereby only the fasteners driven into structural members are installed by pneumatic or powder-actuated discharge and sidelap fasteners are installed by a drill.

23. A non-transitory computer-readable medium storing instructions that, when executed by one or more controllers of an autonomous metal deck fastening system, cause the controllers to:

perform a pre-operation self-test and accept session settings including a fastening pattern, travel direction, sidelap screw spacing, and an energy profile mapping structural-pin type to pneumatic pressure or powder charge level;

home a fastener distribution gantry and enable pin orienters or strip feeders to stage pins and screw sorters to stage screws;

lower a sensor assembly into a corrugation of a corrugated
   metal decking while maintaining a carriage heading
   from corrugation guide sensor feedback;
navigate along the corrugation, stop over a detected purlin
   top chord, and for structural-member locations actuate
a structural fastening unit so that a linear actuator
   plunges a pin-driving head, and commands a pneumatic
   discharge or powder-actuated shot to drive a metal pin;
advance between structural-pin locations and at sidelap
   intervals actuate a sidelap fastening unit so that a linear
actuator plunges a drill while a pulse-width-modulated
   signal sets drill speed to drive a screw released from a
   spring-biased jaw mechanism through overlapping
   sheets; and
enforce interlocks that inhibit motion or actuation upon
detection of a metal deck edge, an obstacle, a missing-
   fastener condition, or a contact-trip not engaged,
   whereby pneumatic or powder-actuated discharge is
   used only for fasteners driven into structural members
   while sidelap fasteners are installed by a drill.

* * * * *